US011551668B1

(12) United States Patent
Baevski et al.

(10) Patent No.: US 11,551,668 B1
(45) Date of Patent: Jan. 10, 2023

(54) GENERATING REPRESENTATIONS OF SPEECH SIGNALS USING SELF-SUPERVISED LEARNING

(71) Applicant: Meta Platforms, Inc., Menlo Park, CA (US)

(72) Inventors: Alexei Baevski, Redwood City, CA (US); Yuhao Zhou, Menlo Park, CA (US); Abdelrahman Mohamed, Redmond, WA (US); Michael Auli, Portola Valley, CA (US); Ronan Stéfan Collobert, Mountain View, CA (US); Alexis Conneau, Foster City, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 161 days.

(21) Appl. No.: 17/138,362

(22) Filed: Dec. 30, 2020

(51) Int. Cl.
| | |
|---|---|
| *G10L 15/06* | (2013.01) |
| *G06K 9/62* | (2022.01) |
| *G10L 15/26* | (2006.01) |
| *G10L 15/16* | (2006.01) |

(52) U.S. Cl.
CPC .......... *G10L 15/063* (2013.01); *G06K 9/6259* (2013.01); *G10L 15/16* (2013.01); *G10L 15/26* (2013.01)

(58) Field of Classification Search
CPC ....... G10L 15/063; G10L 15/16; G10L 15/26; G10L 21/02; G06K 9/6259; H04N 19/184
See application file for complete search history.

(56) References Cited

U.S. PATENT DOCUMENTS

| | | | | |
|---|---|---|---|---|
| 9,558,523 | B1 * | 1/2017 | Hodge | G06Q 50/26 |
| 10,217,058 | B2 * | 2/2019 | Gamon | G06N 20/00 |
| 10,468,014 | B1 * | 11/2019 | Edwards | G10L 15/07 |
| 10,600,004 | B1 * | 3/2020 | Misko | G06Q 30/0202 |

(Continued)

OTHER PUBLICATIONS

Alumäe, et al., The 2016 BBN Georgian Telephone Speech Keyword Spotting System. In Proc. of ICASSP, 2017.

(Continued)

*Primary Examiner* — Michael Colucci
(74) *Attorney, Agent, or Firm* — Baker Botts L.L.P.

(57) ABSTRACT

In one embodiment, a method includes generating audio segments from a speech signal, generating latent representations that respectively correspond to the audio segments, the latent representations comprising a first subset and a second subset, generating quantized representations that respectively correspond to the latent representations, masking the second subset of the latent representations, using a machine-learning model to process the first subset of the latent representations and the masked second subset of the latent representations to generate contextualized representations that respectively correspond to the latent representations, pre-training the machine-learning model based on comparisons between (1) a subset of the contextualized representations that respectively correspond to the masked second subset of the latent representations and (2) a subset of the quantized representations that respectively correspond to the masked second subset of the latent representations, and training the pre-trained machine-learning model to perform a speech analysis task.

19 Claims, 7 Drawing Sheets

(56) References Cited

U.S. PATENT DOCUMENTS

| | | | |
|---|---|---|---|
| 11,082,789 B1* | 8/2021 | Mimilakis | G10L 21/02 |
| 2018/0293464 A1* | 10/2018 | Martin | G06V 10/762 |
| 2019/0341050 A1* | 11/2019 | Diamant | H04N 7/147 |
| 2020/0126533 A1* | 4/2020 | Doyle | G10L 15/1815 |
| 2020/0234725 A1* | 7/2020 | Garbacea | G10L 19/16 |
| 2022/0103839 A1* | 3/2022 | Van Rozendaal | H04N 19/184 |
| 2022/0108712 A1* | 4/2022 | Song | G10L 25/30 |
| 2022/0189456 A1* | 6/2022 | Pang | G10L 13/027 |

OTHER PUBLICATIONS

Amodei, et al., Deep Speech 2: End-to-End Speech Recognition in English and Mandarin. In Proc. of ICML, 2016.
Ardila, et al., Common Voice: A Massively-Multilingual Speech Corpus. arXiv, abs/1912.06670, 2019.
Arivazhagan, et al., Massively Multilingual Neu¬Ral Machine Translation in the Wild: Findings and Challenges. arXiv preprint arXiv:1907.05019, 2019.
Ba, et al., Layer Normalization. arXiv, 2016.
Bachman, et al., Learning Representations by Maximizing Mutual Information Across Views. In Proc. of NeurIPS, 2019.
Baevski, et al., Adaptive Input Representations for Neural Language Modeling. In Proc. of ICLR, 2018.
Baevski, et al., Cloze-Driven Pretraining of Self-Attention Networks. arXiv, abs/1903.07785, 2019.
Baevski, et al., Effectiveness of Self-Supervised Pre-Training for Speech Recognition. arXiv, abs/1911.03912, 2019.
Baevski, et al., Vq-Wav2vec: Self-Supervised Learning of Discrete Speech Representations. In Proc. of ICLR, 2020.
Baevski et al., Wav2vec 2.0: A Framework for Self-Supervised Learning of Speech Representations. arXiv, abs/2006.11477, 2020.
Bourlard, et al., Current Trends in Multilingual Speech Processing. Sadhana, 36, 2011.
Burget, et al., Multilingual Acoustic Modeling for Speech Recognition Based on Subspace Gaussian Mixture Models. In Proc. of ICASSP, 2010.
Byrne, et al., Towards Language Independent Acoustic Modeling. In Proc. of ICASSP, 2000.
Chen, et al., A Simple Framework for Contrastive Learning of Visual Representations. arXiv, abs/2002.05709, 2020.
Chen, et al., Almost-Unsupervised Speech Recognition with Close-to-Zero Resource Based on Phonetic Structures Learned from Very Small Un¬Paired Speech and Text Data. arXiv, abs/1810.12566, 2018.
Cho, et al., Multilingual Sequence-to-Sequence Speech Recognition: Architecture, Transfer Learning, and Language Modeling. In Proc. of IEEE SLT, 2018.
Chorowski, et al., Unsupervised Speech Representation Learning Using Wavenet Autoencoders. arXiv, abs/1901.08810, 2019.
Chung, et al., An Unsupervised Autoregressive Model for Speech Representation Learning. arXiv, abs/1904.03240, 2019.
Chung, et al., Speech2vec: A Sequence-to-Sequence Framework for Learning Word Embeddings from Speech. arXiv, abs/1803.08976, 2018.
Chung, et al., Unsupervised Cross-Modal Alignment of Speech and Text Embedding Spaces. arXiv, abs/1805.07467, 2018.
Collobert, et al., A Fully Differentiable Beam Search Decoder. arXiv, abs/1902.06022, 2019.
Collobert, et al., Natural Language Processing (Almost) From Scratch. JMLR, 2011.
Collobert, et al., Wav2letter: An End-to-End Convnet-Based Speech Recognition System. arXiv, abs/1609.03193, 2016.
Conneau, et al., Unsupervised Cross-Lingual Representation Learning at Scale. arXiv, abs/1911.02116, 2019.
Dauphin, et al., Language Modeling with Gated Convolutional Networks. In Proc. of ICML, 2017.
Deng, et al., Imagenet: A Large-Scale Hierarchical Image Database. In Proc. of CVPR, 2009.
Devlin, et al., Bert: Pre-Training of Deep Bidirectional Transformers for Language Understanding. arXiv, abs/1810.04805, 2018.
Dieleman, et al., The Challenge of Realistic Music Generation: Modelling Raw Audio at Scale. arXiv, 2018.
Doersch, et al., Unsupervised Visual Representation Learning by Context Prediction. In proc. of ICCV, 2015.
Edunov, et al., Pre-Trained Language Model Representations for Language Generation. In Proc. of NAACL, 2019.
Eloff, et al., Unsupervised Acoustic Unit Discovery for Speech Synthesis Using Discrete Latent-Variable Neural Networks. arXiv, abs/1904.07556, 2019.
Fan, et al., Reducing Transformer Depth on Demand with Structured Dropout. In Proc. of ICLR, 2020.
Fer, et al., Multilingually Trained Bottleneck Features in Spoken Language Recognition. Computer Speech & Language, 46:252-267, 2017.
Gales, et al., Low-Resource Speech Recognition and Keyword-Spotting. In Proc. of SPECOM, pp. 3-19. Springer, 2017.
Gales, et al., Speech Recognition and Keyword Spotting for Low-Resource Languages: Babel Project Research at Cued. In n Spoken Language Technologies for Under-Resourced Languages, 2014.
Garofolo, et al., The DARPA TIMIT Acoustic-Phonetic Continuous Speech Corpus CDROM. Linguistic Data Consortium, 1993.
Garofolo, John S., et al. CSR-I (WSJ0) Complete LDC93S6A. CSR WSJ0 Detailed Orthographic Transcription Specification. Philadelphia: Linguistic Data Consortium, 1993.
Ghahremani, et al., Investigation of Transfer Learning for Asr Using Lf-Mmi Trained Neural Networks. In Proc. of ASRU, 2017.
Ghoshal, et al., Multilingual training of deep neural networks. In Proc. of ICASSP, 2013.
Graves, et al., Connectionist Temporal Classification: Labelling Unsegmented Sequence Data with Recurrent Neural Networks. In Proc. of ICML, 2006.
Gulati, et al., Conformer: Convolution-Augmented Transformer for Speech Recognition. arXiv, 2020.
Gumbel, et al., Statistical Theory of Extreme Values and Some Practical Applications: A Series of Lectures, vol. 33. US Government Printing Office, 1954.
Gutmann et al., Noise-Contrastive Estimation: A New Estimation Principle for Unnormalized Statistical Models. In Proc. of AISTATS, 2010.
Hadian, et al., End-to-End Speech Recognition Using Lattice-Free Mmi. In Proc. of Interspeech, 2018.
Han, et al., Contextnet: Improving Convolutional Neural Networks for Automatic Speech Recognition with Global Context. arXiv, 2020.
Harwath, et al., Learning Hierarchical Discrete Linguistic Units from Visually-Grounded Speech. In Proc. of ICLR, 2020.
He, et al., Momentum Contrast for Unsupervised Visual Representation Learning. arXiv, abs/1911.05722, 2019.
Heafield, et al., Scalable Modified Kneser-Ney Language Model Estimation. In Proc. of ACL, 2013.
Heigold, et al., Multilingual Acoustic Models Using Distributed Deep Neural Networks. In Proc. of ICASSP, 2013.
Hénaff, et al., Data-Efficient Image Recognition with Contrastive Predictive Coding. arXiv, abs/1905.09272, 2019.
Hendrycks, et al., Gaussian Error Linear Units (gelus). arXiv, 2016.
Huang, et al., Cross-Language Knowledge Transfer Using Multilingual Deep Neural Network with Shared Hidden Layers. In ICASSP, 2013.
Huang, et al., Deep Networks with Stochastic Depth. arXiv, 2016.
Inaguma, et al., Transfer Learning of Language-Independent End-to-End ASR With Language Model Fusion. In Proc. of ICASSP, 2019.
Jang, et al., Categorical Reparameterization With Gumbel-Softmax. arXiv, abs/1611.01144, 2016.
Jegou, et al., Product Quantization for Nearest Neighbor Search. IEEE Trans. Pattern Anal. Mach. Intell., 33(1):117-128, Jan. 2011.
Jiang, et al., Improving Transformer-Based Speech Recognition Using Unsupervised Pre-Training. arXiv, abs/1910.09932, 2019.
Kahn, et al., Libri-Light: A Benchmark for Asr With Limited or No Supervision. In Proc. of ICASSP, 2020.

(56) References Cited

OTHER PUBLICATIONS

Kamper, et al., A Segmental Framework for Fully-Unsupervised Large-Vocabulary Speech Recognition. Comput. Speech Lang., 46(C), Nov. 2017.
Kannan, et al., Large-Scale Multilingual Speech Recognition with a Streaming End-to-End Model. In Proc. of Interspeech, 2019.
Kawakami, et al., Learning Robust and Multilingual Speech Representations. arXiv, 2020.
Kingma, et al., A Method for Stochastic Optimization. In Proc. of ICLR, 2015.
Kunze, et al., Transfer Learning for Speech Recognition on a Budget. In Proc. of Workshop on Representation Learning for NLP, 2017.
Lample, et al., Cross-Lingual Language Model Pretraining. In Proc. of NeurIPS, 2019.
Laptev, et al., You Do Not Need More Data: Improving End-to-End Speech Recognition by Text-to-Speech Data Augmentation. arXiv, abs/2005.07157, 2020.
Le, et al., Automatic speech recognition for under-resourced languages: application to vietnamese language. Ieee transactions on audio, speech, and language processing, 17, 2009.
Lewis, et al., Ethnologue: Languages of the World, Nineteenth Edition. Online version: http://www.ethnologue.com, 2016.
Lian, et al., Improving Speech Emotion Recognition Via Transformer-Based Predictive Coding Through Transfer Learning. arXiv, abs/1811.07691, 2018.
Likhomanenko, et al., Who needs words? Lexicon-free speech recognition. In Proc. of Interspeech, 2019.
Lin, et al., Microsoft Coco: Common Objects in Context. In Proc. of ECCV, 2014.
Liu, et al., Roberta: A Robustly Optimized Bert Pretraining Approach. arXiv preprint arXiv: 1907.11692, 2019.
Liu, et al., Towards Unsupervised Speech Recognition and Synthesis with Quantized Speech Representation Learning. arXiv, 2019.
Loshchilov, et al., SGDR: Stochastic Gradient Descent with Restarts. arXiv, abs/1608.03983, 2016.
Lüscher, et al., Rwth Asr Systems for Librispeech: Hybrid Vs Attention. In Interspeech 2019, 2019.
Maddison, et al., A* Sampling. In Advances in Neural Information Processing Systems, pp. 3086-3094, 2014.
Metze, et al., Semi-Supervised Training in Low-Resource Asr and Kws. In Proc. of ICASSP, 2015.
Mikolov, et al., Distributed Representations of Words and Phrases and Their Compositionality. In Proc. of NIPS, 2013.
Misra, et al., Self-Supervised Learning of Pretext-Invariant Representations. arXiv, 2019.
Mohamed, et al., Transformers with Convolutional Context for ASR. CoRR, abs/1904.11660, 2019.
Ott, et al., Fairseq: A Fast, Extensible Toolkit for Sequence Modeling. In Proc. of NAACL System Demonstrations, 2019.
Ott, et al., Scaling Neural Machine Translation. In Proc. of WMT, 2018.
Panayotov, et al., Librispeech: An Asr Corpus Based on Public Domain Audio Books. In Proc. of ICASSP, pp. 5206-5210. IEEE, 2015.
Park, et al., Improved Noisy Student Training for Automatic Speech Recognition. arXiv, abs/2005.09629, 2020.
Park, et al., Specaugment: A Simple Data Augmentation Method for Automatic Speech Recognition. In Proc. of Interspeech, 2019.
Pavllo, et al., 3d Human Pose Estimation in Video with Temporal Convolutions and Semi-Supervised Training. In Proc. of CVPR, 2019.
Peters, et al., Deep Contextualized Word Representations. In Proc. of ACL, 2018.
Pratap, et al., Wav2letter++: A Fast Open-Source Speech Recognition System. In Proc. of ICASSP, 2019.
Radford, et al., Language Understanding by Generative Pre-Training. https://s3-us-west-2.amazonaws.com/openai-assets/research-covers/language-unsupervised/language_understanding_paper.pdf, 2018.
Ragni, et al., Stimulated Training for Automatic Speech Recognition and Keyword Search in Limited Resource Conditions. In Proc. of ICASSP, 2017.
Ravanelli, et al., Learning Speaker Representations with Mutual Information. arXiv, abs/1812.00271, 2018.
Ravanelli, et al., Light Gated Recurrent Units for Speech Recognition. IEEE Transactions on Emerging Topics in Computational Intelligence, 2(2):92-102, 2018.
Ravanelli, et al., Multi-Task Self-Supervised Learning for Robust Speech Recognition. arXiv, 2020.
Riviere, et al., Unsupervised Pretraining Transfers Well Across Languages. arXiv, abs/2002.02848, 2020.
Schuster, et al., Japanese and Korean Voice Search. In Proc. of ICASSP, 2012.
Seki, et al., An End-to-End Language-Tracking Speech Recognizer for Mixed-Language Speech. In Proc. of ICASSP, 2018.
Synnaeve, et al., A Temporal Coherence Loss Function for Learning Unsupervised Acoustic Embeddings. In Proc. of SLTU, 2016.
Synnaeve, et al., End-to-End ASR: From Supervised to Semi-Supervised Learning with Modern Architectures. arXiv, abs/1911.08460, 2020.
Tjandra, et al., Vqvae Unsupervised Unit Discovery and Multi-Scale Code2spec Inverter for Ze-Rospeech Challenge 2019. arXiv, 1905.11449, 2019.
Toshniwal, et al., Multilingual Speech Recognition with a Single End-to-End Model. In Proc. of ICASSP, 2018.
Van Den Oord, et al., Neural Discrete Representation Learning. In Advances in Neural Information Processing Systems, pp. 6306-6315, 2017.
Van Den Oord, et al., Representation Learning with Contrastive Predictive Coding. arXiv, abs/1807.03748, 2018.
Vaswani, et al., Attention Is All You Need. In Proc. of NIPS, 2017.
Vinyals, et al., Show and Tell: Lessons Learned from the 2015 MS COCO Image Captioning Challenge. arXiv, abs/1609.06647, 2016.
Wang, et al., Unsupervised Pre-Training of Bidirectional Speech Encoders Via Masked Reconstruction. arXiv, 2020.
Wenzek, et al., Ccnet: Extracting High Quality Monolingual Datasets from Web Crawl Data, 2019.
Woodland, et al., Large Vocabulary Continuous Speech Recognition Using Htk. In Proc. of ICASSP, 1994.
Wu, et al., Group Normalization. arXiv, abs/1803.08494, 2018.
Wu, et al., Pay Less Attention with Lightweight and Dynamic Convolutions. In Proc. of ICLR, 2019.
Xu, et al., Iterative Pseudo-Labeling for Speech Recognition. arXiv, 2020.
Zeghidour, et al., Fully Convolutional Speech Recognition. arXiv, abs/1812.06864, 2018.
Zeghidour, et al., Learning Filterbanks From Raw Speech for Phone Recognition. In Proc. of ICASSP, 2018.
Zhang et al., Transformer Transducer: A Streamable Speech Recognition Model with Transformer Encoders and Rnn-T Loss. arXiv, 2020.

\* cited by examiner

GENERATING REPRESENTATIONS OF SPEECH SIGNALS USING SELF-SUPERVISED LEARNING

TECHNICAL FIELD

This disclosure generally relates to speech recognition using machine learning, and in particular relates to hardware and software for speech recognition.

BACKGROUND

Speech recognition is an interdisciplinary subfield of computer science and computational linguistics that develops methodologies and technologies that enable the recognition and translation of spoken language into text by computers. It is also known as automatic speech recognition (ASR), computer speech recognition or speech to text (STT). It incorporates knowledge and research in the computer science, linguistics and computer engineering fields. Some speech recognition systems require "training" where an individual speaker reads text or isolated vocabulary into the system. The system analyzes the person's specific voice and uses it to fine-tune the recognition of that person's speech, resulting in increased accuracy. Speech recognition applications include voice user interfaces such as voice dialing, call routing, search key words, simple data entry, preparation of structured documents, determining speaker characteristics, speech-to-text processing, and aircraft. The term voice recognition or speaker identification refers to identifying the speaker, rather than what they are saying. Recognizing the speaker can simplify the task of translating speech in systems that have been trained on a specific person's voice or it can be used to authenticate or verify the identity of a speaker as part of a security process. From the technology perspective, speech recognition has a long history with several waves of major innovations. Most recently, the field has benefited from advances in deep learning and big data. The advances are evidenced not only by the surge of academic papers published in the field, but more importantly by the worldwide industry adoption of a variety of deep learning methods in designing and deploying speech recognition systems.

SUMMARY OF PARTICULAR EMBODIMENTS

In particular embodiments, a computing system may train a model for learning representations of speech audio using self-supervised learning to address the scarcity of labeled training data. The model may be first pre-trained from unlabeled speech data to figure out the structure of the speech, and then the model may be subsequently fine-tuned using a small amount of labeled speech data. Specifically, the model may encode speech data using a convolutional neural network and then mask the speech input in a latent space. The latent representations may be then fed to a transformer network to build contextualized representations. After the above pre-training process, the model may have learned speech units common to several languages to handle cross-lingual speech tasks, which may be particularly useful as languages with little data available can benefit from languages with more data available. Although this disclosure describes learning particular representations by particular systems in a particular manner, this disclosure contemplates learning any suitable representation by any suitable system in any suitable manner.

In particular embodiments, the computing system may generate audio segments from a speech signal. The computing system may generate latent representations that respectively correspond to the audio segments, the latent representations comprising a first subset and a second subset. In particular embodiments, the computing system may generate quantized representations that respectively correspond to the latent representations. The computing system may then mask the second subset of the latent representations. In particular embodiments, the computing system may use a machine-learning model to process the first subset of the latent representations and the masked second subset of the latent representations to generate contextualized representations that respectively correspond to the latent representations. The computing system may pre-train the machine-learning model based on comparisons between (1) a subset of the contextualized representations that respectively correspond to the masked second subset of the latent representations and (2) a subset of the quantized representations that respectively correspond to the masked second subset of the latent representations. In particular embodiments, the computing system may further train the pre-trained machine-learning model to perform a speech analysis task.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
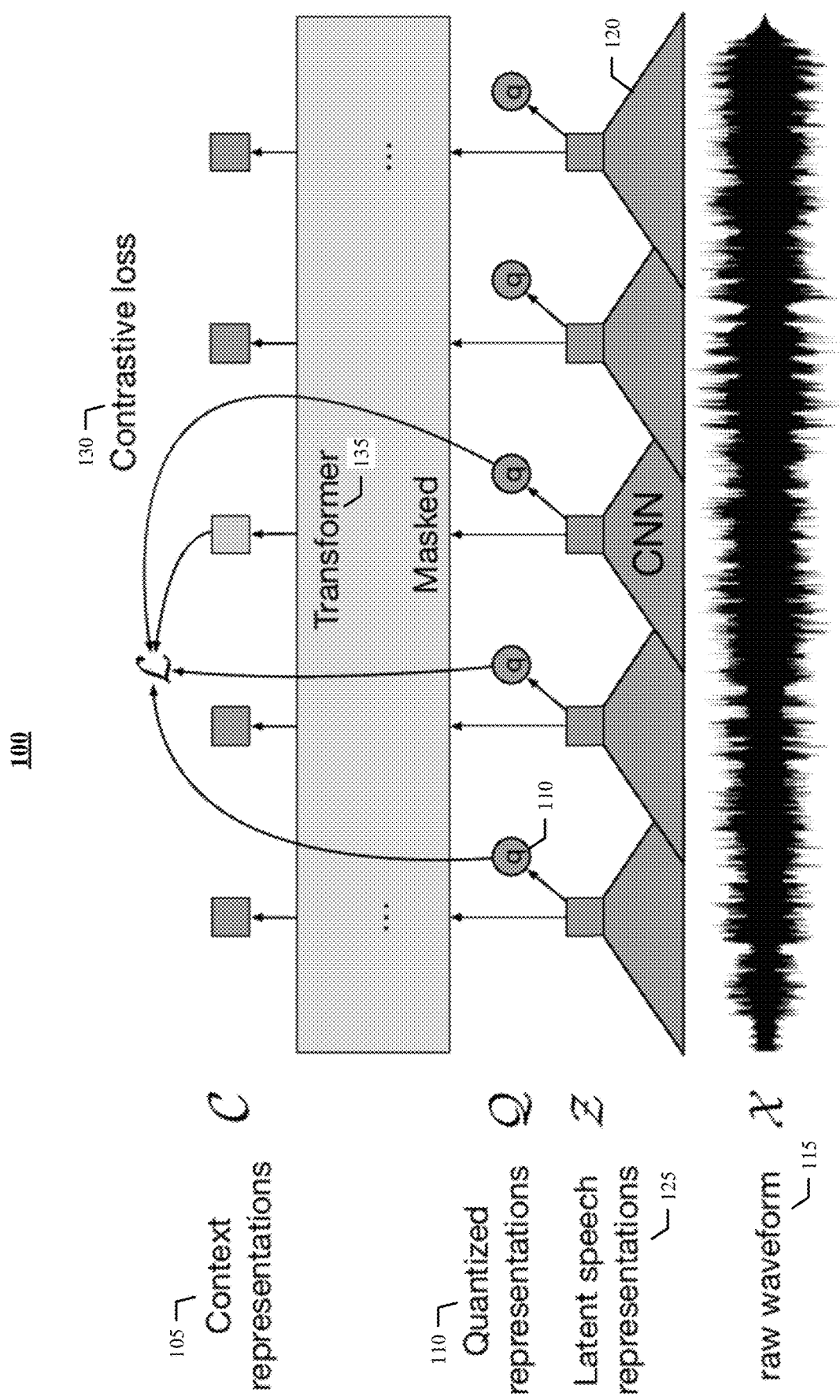
FIG. 1 illustrates an example framework which jointly learns contextualized speech representations and an inventory of discretized speech units.

In particular embodiments, a computing system may train a model for learning representations of speech audio using self-supervised learning to address the scarcity of labeled training data. The model may be first pre-trained from unlabeled speech data to figure out the structure of the speech, and then the model may be subsequently fine-tuned using a small amount of labeled speech data. Specifically, the model may encode speech data using a convolutional neural network and then mask the speech input in a latent space. The latent representations may be then fed to a transformer network to build contextualized representations. After the above pre-training process, the model may have learned speech units common to several languages to handle cross-lingual speech tasks, which may be particularly useful as languages with little data available can benefit from languages with more data available. Although this disclosure describes learning particular representations by particular systems in a particular manner, this disclosure contemplates learning any suitable representation by any suitable system in any suitable manner.

In particular embodiments, the computing system may generate audio segments from a speech signal. The computing system may generate latent representations that respectively correspond to the audio segments, the latent representations comprising a first subset and a second subset. In particular embodiments, the computing system may generate quantized representations that respectively correspond to the latent representations. The computing system may then mask the second subset of the latent representations. In particular embodiments, the computing system may use a machine-learning model to process the first subset of the latent representations and the masked second subset of the latent representations to generate contextualized representations that respectively correspond to the latent representations. The computing system may pre-train the machine-learning model based on comparisons between (1) a subset of the contextualized representations that respectively correspond to the masked second subset of the latent representations and (2) a subset of the quantized representations that respectively correspond to the masked second subset of the latent representations. In particular embodiments, the computing system may further train the pre-trained machine-learning model to perform a speech analysis task.

The embodiments disclosed herein show for the first time that learning powerful representations from speech audio alone followed by fine-tuning on transcribed speech may outperform the best semi-supervised methods while being conceptually simpler. In particular embodiments, a computing system may mask the speech input in the latent space and solve a contrastive task defined over a quantization of the latent representations which are jointly learned. Experiments using all labeled data of Librispeech achieve 1.8/3.3 WER on the clean/other test sets. When lowering the amount of labeled data to one hour, the embodiments disclosed herein outperform the previous state of the art on the 100-hour subset while using 100 times less labeled data. In particular embodiments, pre-training the machine-learning model may be on a plurality of unlabeled training data. Training the pre-trained machine-learning model may be based on one or more labeled training data. The one or more labeled training data may be associated with the speech analysis task. Using just ten minutes of labeled data and pre-training on 53k hours of unlabeled data still achieves 4.8/8.2 WER. This demonstrates the feasibility of speech recognition with limited amounts of labeled data. There are around 7,000 languages in the world and many more dialects. However, for most of them no speech recognition technology exists since current systems require hundreds or thousands of hours of labeled data which is hard to collect for most languages. The embodiments disclosed herein show that speech recognition models may be built with very small amounts of annotated data at very good accuracy. The embodiments disclosed herein may make speech recognition technology more broadly available to many more languages and dialects.

In particular embodiments, the speech signal may be based on a plurality of languages. Accordingly, the embodiments disclosed herein may further learn cross-lingual speech representations by pretraining a single model from the raw waveform of speech in multiple languages. In particular embodiments, pretraining the machine-learning model may be based on a plurality of unlabeled training data associated with the plurality of languages. The embodiments disclosed herein may build on a concurrently introduced self-supervised model which is trained by solving a contrastive task over masked latent speech representations and jointly learns a quantization of the latent speech representations shared across languages. The resulting model may be fine-tuned on labeled data and experiments show that cross-lingual pretraining significantly outperforms monolingual pretraining. On the CommonVoice benchmark, our model shows a relative phoneme error rate reduction of 72% compared to the best known results. On BABEL, our approach improves word error rate by 16% relative compared to the strongest comparable system. Our approach enables a single multilingual speech recognition model which is competitive to strong individual models. Analysis shows that the latent discrete speech representations are shared across languages with increased sharing for related languages.

Neural networks benefit from large quantities of labeled training data. However, in many settings labeled data is much harder to come by than unlabeled data: current speech recognition systems may require thousands of hours of transcribed speech to reach acceptable performance which is not available for the vast majority of the nearly 7,000 languages spoken worldwide. Learning purely from labeled examples may not resemble language acquisition in humans: infants learn language by listening to adults around them—a process that requires learning good representations of speech.

In machine learning, self-supervised learning has emerged as a paradigm to learn general data representations from unlabeled examples and to fine-tune the model on labeled data. This has been particularly successful for natural language processing and is an active research area for computer vision.

The embodiments disclosed herein present a framework for self-supervised learning of representations from raw audio data. Our approach may encode speech audio via a multi-layer convolutional neural network and then mask spans of the resulting latent speech representations, similar to masked language modeling. The latent representations may be fed to a Transformer network to build contextualized representations and the model may be trained via a contrastive task where the true latent is to be distinguished from distractors.

The embodiments disclosed herein additionally focus on the cross-lingual setting by learning representations on unlabeled data that generalize across languages. The embodiments disclosed herein may build on a concurrently introduced pretraining approach which jointly learns contextualized representations of speech as well as a discrete vocabulary of latent speech representations. The latter may serve to effectively train the model with a contrastive loss. These discrete latent speech representations may be shared across languages.

FIG. 1 illustrates an example framework 100 which jointly learns contextualized speech representations 105 and an inventory of discretized speech units 110. The input may be raw waveforms 115. As part of training, the embodiments disclosed herein may learn discrete speech units 110 via a gumbel softmax based on CNN 120 to represent the latent representations 125 in the contrastive task 130 (see FIG. 1) which we find to be more effective than non-quantized targets. A Transformer network 135 to build contextualized representations 105. After pre-training on unlabeled speech, the model may be fine-tuned on labeled data with a Connectionist Temporal Classification (CTC) loss to be used for downstream speech recognition tasks.

Figure 2:
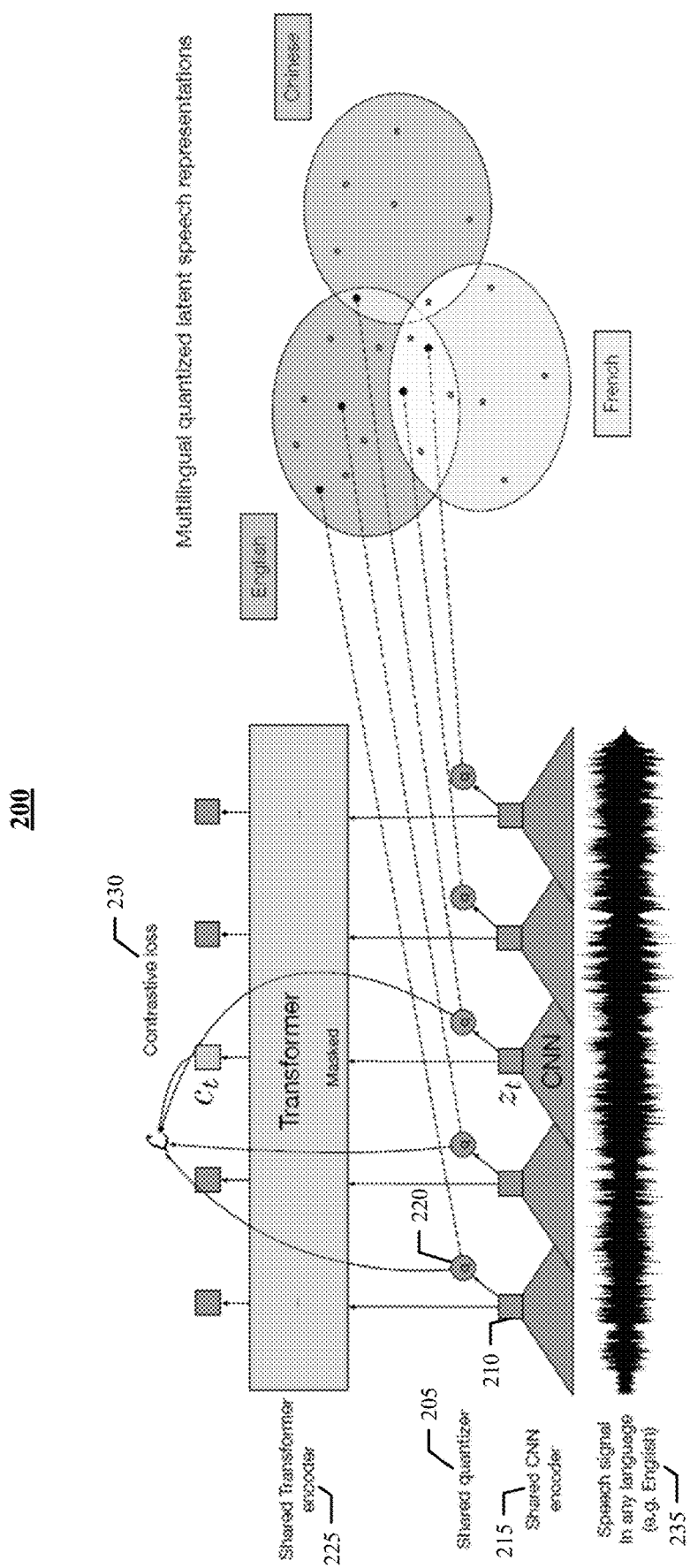
FIG. 2 illustrates an example framework for cross-lingual speech representation learning.

FIG. 2 illustrates an example framework 200 for cross-lingual speech representation learning. A shared quantization module 205 over feature encoder representations 210 generated by a shared CNN encoder 215 may produce multilingual quantized latent speech units 220 whose embeddings are then used as targets for a single shared transformer encoder 225 trained with contrastive learning 230. The model may learn to share discrete tokens 220 across languages, creating bridges across languages. Our approach may require only raw unsupervised speech audio 235 from multiple languages.

Previous work learned a quantization of the data followed by a contextualized representation with a self-attention model, whereas our approach may solve both problems end-to-end. Masking parts of the input with Transformer networks for speech may have been explored, but prior work may rely either on a two-step pipeline or their model may be trained by reconstructing the filter bank input features. Other related work may include learning representations from auto-encoding the input data or directly predicting future timesteps.

Our results show that jointly learning discrete speech units with contextualized representations may achieve substantially better results than fixed units learned in a prior step. The embodiments disclosed herein also demonstrate the feasibility of ultra-low resource speech recognition: when using only 10 minutes of labeled data, our approach achieves word error rate (WER) 4.8/8.2 on the clean/other test sets of Librispeech. The embodiments disclosed herein set a new state of the art on TIMIT phoneme recognition as well as the 100-hour clean subset of Librispeech. Moreover, when we lower the amount of labeled data to just one hour, the embodiments disclosed herein still outperform the previous state of the art self-training method while using 100 times less labeled data and the same amount of unlabeled data. When we use all 960 hours of labeled data from Librispeech, then our model achieves 1.8/3.3 WER.

Our model may be composed of a multi-layer convolutional feature encoder $f: X \rightarrow Z$ which takes as input raw audio X and outputs latent speech representations $z_1, \ldots z_T$ for T time-steps. In other words, generating the latent representations may be based on a multi-layer convolutional neural network. They may be then fed to a Transformer g: $Z \rightarrow C$ to build representations $c_1, \ldots c_T$ capturing information from the entire sequence. For the cross-lingual setting, each of the latent representations may be common to the plurality of languages. The output of the feature encoder may be discretized to $q_t$ with a quantization module $Z \rightarrow Q$ to represent the targets (see FIG. 1) in the self-supervised objective. Compared to vq-wav2vec (i.e., a conventional work), our model may build context representations over continuous speech representations and self-attention may capture dependencies over the entire sequence of latent representations end-to-end.

Feature encoder. The encoder may comprise several blocks containing a temporal convolution followed by layer normalization and a GELU activation function. In particular embodiments, the computing system may normalize the speech signal to zero mean and unit variance. In other words, the raw waveform input to the encoder may be normalized to zero mean and unit variance. In particular embodiments, generating the audio segments may be based on one or more time-steps. Each of the one or more time-steps may comprise an amount of time. The total stride of the encoder may determine the number of time-steps T which are input to the Transformer.

Contextualized representations with Transformers. The output of the feature encoder may be fed to a context network which follows the Transformer architecture. Instead of fixed positional embeddings which encode absolute positional information, the embodiments disclosed herein may use a convolutional layer which acts as relative positional embedding. The embodiments disclosed herein may add the output of the convolution followed by a GELU to the inputs and then apply layer normalization. For the cross-lingual setting, each of the contextualized representations may be common to the plurality of languages.

Quantization module. For self-supervised training the embodiments disclosed herein may discretize the output of the feature encoder z to a finite set of speech representations via product quantization. In other words, generating the quantized representations may be based on product quantization. For the cross-lingual setting, each of the quantized representations may be common to the plurality of languages. This choice led to good results in prior work which learned discrete units in a first step followed by learning contextualized representations. Product quantization may amount to choosing quantized representations from multiple codebooks and concatenating them. Given G codebooks, or groups, with V entries $e \in \mathbb{R}^{V \times d/G}$, the embodiments disclosed herein may choose one entry from each codebook and concatenate the resulting vectors $e_1, \ldots, e_G$ and apply a linear transformation $\mathbb{R}^d \rightarrow \mathbb{R}^f$ to obtain $q \in \mathbb{R}^f$. In other words, generating each of the quantized representations may comprise the following steps. Firstly, the computing system may access a plurality of codebooks. Each of the plurality of codebooks may comprise a plurality of vector entries. Secondly, the computing system may select one vector entry from each of the plurality of codebooks. Thirdly, the computing system may concatenate the plurality of vector entries to generate a concatenated vector. Lastly, the computing system may apply a linear transformation to the concatenated vector to generate the quantized representation.

The Gumbel softmax may enable choosing discrete codebook entries in a fully differentiable way. The embodiments disclosed herein may use the straight-through estimator and setup G hard Gumbel softmax operations. The feature encoder output z may be mapped to $l \in \mathbb{R}^{G \times V}$ logits and the probablities for choosing the v-th codebook entry for group g may be $$P_{g,v} = \frac{\exp(l_{g,v} + n_v)/\tau}{\sum_{k=1}^{V} \exp(l_{g,k} + n_k)/\tau} \quad (1)$$

where $\tau$ is a non-negative temperature, $n=-\log(-\log(u))$ and u are uniform samples from $\mathcal{U}(0, 1)$. During the forward pass, codeword i may be chosen by $i=\text{argmax}_j p_{g,j}$ and in the backward pass, the true gradient of the Gumbel softmax outputs may be used.

To pre-train the model the embodiments disclosed herein may mask a certain proportion of time-steps in the latent feature encoder space, similar to masked language modeling in BERT. The training objective may require identifying the correct quantized latent audio representation in a set of distractors for each masked time-step and the final model may be fine-tuned on the labeled data.

The embodiments disclosed herein may mask a proportion of the feature encoder outputs, or time-steps before feeding them to the context network and replace them with a trained feature vector shared between all masked timesteps. The embodiments disclosed herein may not mask inputs to the quantization module. To mask the latent speech representations output by the encoder, the embodiments disclosed herein may randomly sample without replacement a certain proportion p of all time-steps to be starting indices and then mask the subsequent M consecutive time-steps from every sampled index. Spans may overlap.

During pre-training, the embodiments disclosed herein may learn representations of speech audio by solving a contrastive task $\mathcal{L}_m$ which requires to identify the true quantized latent speech representation for a masked timestep within a set of distractors. This may be augmented by a codebook diversity loss $\mathcal{L}_d$ to encourage the model to use the codebook entries equally often.

$$\mathcal{L} = \mathcal{L}_m + a\mathcal{L}_d \quad (2)$$

where a is a tuned hyperparameter.

Contrastive Loss. In particular embodiments, each of the quantized representations may be associated with a true quantized representation and one or more distractors. Generating the contextualized representations may be based on a contrastive loss function. In particular embodiments, the contrastive loss function may optimize a contextualized representation to be similar to a corresponding true quantized representation but different from the one or more associated distractors. Given context network output $c_t$ centered over masked time-step t, the model may need to identify the true quantized latent speech representation $q_t$ in a set of K+1 quantized candidate representations $\tilde{q} \in Q_t$ which includes $q_t$ and K distractors. Distractors may be uniformly sampled from other masked time-steps of the same utterance. The loss may be defined as $$L_m = -\log \frac{\exp(sim(c_t, q_t)/K)}{\sum_{\tilde{q} \sim Q_t} \exp(sim(c_t, \tilde{q})/K)} \quad (3)$$

where we compute the cosine similarity $sim(a, b) = a^T b / \|a\|\|b\|$ between context representations and quantized latent speech representations.

Diversity Loss. In particular embodiments, generating each of the quantized representations may be based on a diversity loss function. The diversity loss function may optimize a probability of selecting each of the plurality of vector entries in each of the plurality of codebooks to be equal. The contrastive task may depend on the codebook to represent both positive and negative examples and the diversity loss $L_d$ may be designed to increase the use of the quantized codebook representations. The embodiments disclosed herein may encourage the equal use of the V entries in each of the G codebooks by maximizing the entropy of the averaged softmax distribution 1 over the codebook entries for each codebook $\bar{p}_g$ across a batch of utterances. The softmax distribution may not contain the gumbel noise nor a temperature:

$$L_d = \frac{1}{GV} \sum_{g=1}^{G} -H(\bar{p}_g) = \frac{1}{GV} \sum_{g=1}^{G} \sum_{v=1}^{V} \bar{p}_{g,v} \log \bar{p}_{g,v} \quad (4)$$

Note our implementation may maximize perplexity $$\frac{GV - \sum_{g=1}^{G} \exp\left(-\sum_{v=1}^{V} p_{g,v} \log p_{g,v}\right)}{GV}$$

which is equivalent.

When pretraining on L languages, the embodiments disclosed herein may form multilingual batches by sampling speech samples from a multinomial distribution $(p_l)_{l=1,\ldots,L}$ where $$p_l \sim \left(\frac{n_l}{N}\right)^a, n_l$$

being the number of pretraining N hours of language l, N the total number of hours, and a the upsampling factor. The parameter a controls the importance given to high-resource versus low-resource languages during pretraining.

Pre-trained models may be fine-tuned for speech recognition by adding a randomly initialized linear projection on top of the context network into C classes representing the vocabulary of the task. For Librispeech, we have 29 tokens for character targets plus a word boundary token. Models may be optimized by minimizing a CTC loss and the embodiments disclosed herein may apply a modified version of SpecAugment (i.e., a conventional work) by masking to time-steps and channels during training which delays overfitting and significantly improves the final error rates, especially on the Libri-light subsets with few labeled examples.

As unlabeled data the embodiments disclosed herein may consider the Librispeech corpus without transcriptions containing 960 hours of audio (LS-960) or the audio data from LibriVox (LV-60k). For the latter the embodiments disclosed herein follow the preprocessing of a prior art resulting in 53.2k hours of audio. The embodiments disclosed herein fine-tune on five labeled data settings: 960 hours of transcribed Librispeech, the train-clean-100 subset comprising 100 hours (100 hours labeled), as well as the Libri-light limited resource training subsets originally extracted from Librispeech, these are train-10h (10 hours labeled), train-1h (1 hour labeled), train-10min (10 min labeled). The embodiments disclosed herein follow the evaluation protocol of Libri-light for these splits and evaluate on the standard Librispeech dev-other/clean and test-clean/other sets.

The embodiments disclosed herein fine-tune the pre-trained models for phoneme recognition on the TIMIT dataset. It contains five hours of audio recordings with detailed phoneme labels. The embodiments disclosed herein use the standard train, dev and test split and follow the standard protocol of collapsing phone labels to 39 classes.

Models may be implemented in fairseq. For masking, the embodiments disclosed herein sample p=0.065 of all time-steps to be starting indices and mask the subsequent M=10 time-steps. This may result in approximately 49% of all time-steps to be masked with a mean span length of 14.7, or 299ms.

The feature encoder may contain seven blocks and the temporal convolutions in each block have 512 channels with strides (5,2,2,2,2,2,2) and kernel widths (10,3,3,3,3,2,2). This may result in an encoder output frequency of 49 hz with a stride of about 20ms between each sample, and a receptive field of 400 input samples or 25ms of audio. The convolutional layer modeling relative positional embeddings may have kernel size 128 and 16 groups.

The embodiments disclosed herein experiment with two model configurations which use the same encoder architecture but differ in the Transformer setup: BASE contains 12 transformer blocks, model dimension 768, inner dimension (FFN) 3,072 and 8 attention heads. Batches are built by cropping 250k audio samples, or 15.6sec, from each example. Crops are batched together to not exceed 1.4m samples per GPU and the embodiments disclosed herein train on a total of 64 V100 GPUs for 1.6 days. The total batch size is 1.6h.

The LARGE model contains 24 transformer blocks with model dimension 1,024, inner dimension 4,096 and 16 attention heads. The embodiments disclosed herein crop 320k audio samples, or 20sec, with a limit of 1.2m samples per GPU and train on 128 V100 GPUs over 2.3 days for Librispeech and 5.2 days for LibriVox. The total batch size is 2.7h. The embodiments disclosed herein use dropout 0.1 in the Transformer, at the output of the feature encoder and the input to the quantization module. Layers are dropped at a rate of 0.05 for BASE and 0.2 for LARGE. There is no layer drop for LV-60k.

The embodiments disclosed herein optimize with Adam (i.e., a conventional optimizer), warming up the learning rate for the first 8% of updates to a peak of $5\times10^{-4}$ for BASE and $3\times10^{-4}$ for LARGE, and then linearly decay it. LARGE trains for 250k updates, BASE for 400k updates, and LARGE on LV-60k for 600k updates. The embodiments disclosed herein use weight a=0.1 for the diversity loss Equation 2. For the quantization module the embodiments disclosed herein use G=2 and V=320 for both models, resulting in a theoretical maximum of 102.4k codewords. Entries are of size d/G=128 for BASE amd d/G=384 for LARGE. The Gumbel softmax temperature τ is annealed from 2 to a minimum of 0.5 for BASE and 0.1 for LARGE by a factor of 0.999995 at every update. The temperature in the contrastive loss (Equation 3) is set to k=0.1. For the smaller Librispeech dataset, the embodiments disclosed herein regularize the model by applying an L2 penalty to the activations of the final layer of the feature encoder and scale down the gradients for the encoder by a factor of 10. The embodiments disclosed herein also use a slightly different encoder architecture where we do not use layer normalization, and instead of normalizing the raw waveform, the output of the first encoder layer is normalized. In the contrastive loss we use K=100 distractors. The embodiments disclosed herein choose the training checkpoint with the lowest $L_m$ on the validation set.

After pre-training we fine-tune the learned representations on labeled data and add a randomly initialized output layer on top of the Transformer to predict characters (Librispeech/Libri-light) or phonemes (TIMIT). For Libri-light, the embodiments disclosed herein train three seeds with two different learning rates (2e-5 and 3e-5) for all subsets and choose the configuration with lowest WER on dev-other subset decoded with the official 4-gram language model (LM) with beam 50 and fixed model weights (LM weight 2, word insertion penalty -1). For BASE on the labeled 960h subset the embodiments disclosed herein use a learning rate of 1e-4.

The embodiments disclosed herein optimize with Adam and a tri-state rate schedule where the learning rate is warmed up for the first 10% of updates, held constant for the next 40% and then linearly decayed for the remainder. BASE uses a batch size of 3.2m samples per GPU and the embodiments disclosed herein fine-tune on 8 GPUs, giving a total batch size of 1,600sec. LARGE batches 1.28m samples on each GPU and we fine-tune on 24 GPUs, resulting in an effective batch size of 1,920sec. For the first 10k updates only the output classifier is trained, after which the Transformer is also updated. The feature encoder is not trained during fine-tuning. The embodiments disclosed herein mask the feature encoder representations with a strategy similar to SpecAugment (i.e., a conventional work).

During fine-tuning the embodiments disclosed herein may apply a masking strategy to the feature encoder outputs similar to SpecAugment: the embodiments disclosed herein randomly choose a number of starting time-steps for which a span of ten subsequent time-steps is replaced with a mask embedding; spans may overlap and we use the same masked time-step embedding as during pre-training. The embodiments disclosed herein also mask channels by choosing a number of channels as starting indices and then expand each one to cover the subsequent 64 channels. Spans may overlap and the selected channel spans are set to zero value. The embodiments disclosed herein use LayerDrop at a rate of 0.05 for BASE and 0.1 for LARGE during fine-tuning.

The embodiments disclosed herein consider two types of language models (LM): a 4-gram model and a Transformer trained on the Librispeech LM corpus. The Transformer LM contains 20 blocks, model dimension 1,280, inner dimension 6,144 and 16 attention heads. The embodiments disclosed herein tune the weights of the language model (interval [0, 5]) and a word insertion penalty ([-5, 5]) via Bayesian optimization: the embodiments disclosed herein run 128 trials with beam 500 for the 4-gram LM and beam 50 for the Transformer LM and choose the best set of weights according to performance on dev-other. Test performance is measured with beam 1,500 for the n-gram LM and beam 500 for the Transformer LM. The embodiments disclosed herein use a conventional beam search decoder.

The embodiments disclosed herein first evaluate our pre-trained models in settings where the amount of labeled data is limited to get a sense of how the representations learned on unlabeled data can improve low resource settings. If a pre-trained model captures the structure of speech, then it should require few labeled examples to fine-tune it for speech recognition. The models are pre-trained on the audio data of either Librispeech (LS-960) or LibriVox (LV-60k) and most results are obtained by decoding with a Transformer language model (Transf.).

The LARGE model pre-trained on LV-60k and fine-tuned on only 10 minutes of labeled data achieves a word error rate of 5.2/8.6 on the Librispeech clean/other test sets. Ten minutes of labeled data corresponds to just 48 recordings with an average length of 12.5 seconds. This demonstrates that ultra-low resource speech recognition is possible with self-supervised learning on unlabeled data.

TABLE 1

WER on the Librispeech dev/test sets when training on the Libri-light low-resource labeled data setups of 10 min, 1 hour, 10 hours and the clean 100h subset of Librispeech. Models use either the audio of Librispeech (LS-960) or the larger LibriVox (LV-60k) as unlabeled data. The embodiments disclosed herein consider two model sizes: BASE (95m parameters) and LARGE (317m parameters). Prior work used 860 unlabeled hours (LS-860) but the total with labeled data is 960 hours and comparable to our setup.

| Model | Unlabeled data | LM | dev clean | dev other | test clean | test other |
|---|---|---|---|---|---|---|
| 10 min labeled | | | | | | |
| Discrete BERT | LS-960 | 4-gram | 15.7 | 24.1 | 16.3 | 25.2 |
| BASE | LS-960 | 4-gram | 8.9 | 15.7 | 9.1 | 15.6 |
| | | Transf. | 6.6 | 13.2 | 6.9 | 12.9 |
| LARGE | LS-960 | Transf. | 6.6 | 10.6 | 6.8 | 10.8 |
| | LV-60k | Transf. | 4.6 | 7.9 | 4.8 | 8.2 |
| 1 h labeled | | | | | | |
| Discrete BERT | LS-960 | 4-gram | 8.5 | 16.4 | 9.0 | 17.6 |
| BASE | LS-960 | 4-gram | 5.0 | 10.8 | 5.5 | 11.3 |
| | | Transf. | 3.8 | 9.0 | 4.0 | 9.3 |
| LARGE | LS-960 | Transf. | 3.8 | 7.1 | 3.9 | 7.6 |
| | LV-60k | Transf. | 2.9 | 5.4 | 2.9 | 5.8 |
| 10 h labeled | | | | | | |
| Discrete BERT | LS-960 | 4-gram | 5.3 | 13.2 | 5.9 | 14.1 |
| Iter. pseudo- | LS-960 | 4-gram + Transf. | 23.51 | 25.48 | 24.37 | 26.02 |
| labeling | LV-60k | 4-gram + Transf. | 17.00 | 19.34 | 18.03 | 19.92 |
| BASE | LS-960 | 4-gram | 3.8 | 9.1 | 4.3 | 9.5 |
| | | Transf. | 2.9 | 7.4 | 3.2 | 7.8 |
| LARGE | LS-960 | Transf. | 2.9 | 5.7 | 3.2 | 6.1 |
| | LV-60k | Transf. | 2.4 | 4.8 | 2.6 | 4.9 |
| 100 h labeled | | | | | | |
| Hybrid DNN/HMM | — | 4-gram | 5.0 | 19.5 | 5.8 | 18.6 |
| TTS data augm. | — | LSTM | | | 4.3 | 13.5 |
| Discrete BERT | LS-960 | 4-gram | 4.0 | 10.9 | 4.5 | 12.1 |
| Iter. pseudo- | LS-860 | 4-gram + Transf. | 4.98 | 7.97 | 5.59 | 8.95 |
| labeling | LV-60k | 4-gram + Transf. | 3.19 | 6.14 | 3.72 | 7.11 |
| Noisy student | LS-860 | LSTM | 3.9 | 8.8 | 4.2 | 8.6 |
| BASE | LS-960 | 4-gram | 2.7 | 7.9 | 3.4 | 8.0 |
| | | Transf. | 2.2 | 6.3 | 2.6 | 6.3 |
| LARGE | LS-960 | Transf. | 2.1 | 4.8 | 2.3 | 5.0 |
| | LV-60k | Transf. | 1.9 | 4.0 | 2.0 | 4.0 |

Our approach of jointly learning discrete units and contextualized representations clearly improves over previous work which learned quantized audio units in a separate step, reducing WER by a about a third.

A recent iterative self-training approach represents the state of the art on the clean 100-hour subset of Librispeech but it requires multiple iterations of labeling, filtering, and re-training. Our approach may be simpler: we pre-train on the unlabeled data and fine-tune on the labeled data. On the 100-hour subset of Librispeech, their method achieves WER 4.2/8.6 on test-clean/other which compares to WER 2.3/5.0 with the LARGE model in a like for like setup, a relative WER reduction of 45%/42%.

When the LARGE model uses an order of magnitude less labeled data (10h labeled), then it still achieves WER 3.2/6.1, an error reduction of 24%/29% relative to iterative self-training. Using only a single hour of labeled data, the same model achieves WER 3.9/7.6 which improves on both test-clean and test-other by 7%/12%—with two orders of magnitude less labeled data. We note that the Libri-light data splits contain both clean and noisy data leading to better accuracy on test-other compared to test-clean. Increasing model size reduces WER on all setups with the largest improvements on test-other (BASE vs. LARGE both on LS-960) and increasing the amount of unlabeled training data also leads to large improvements (LARGE LS-960 vs. LV-60k).

TABLE 2

WER on Librispeech when using all 960 hours of labeled data (cf. Table 1).

| Model | Unlabeled data | LM | dev clean | dev other | test clean | test other |
|---|---|---|---|---|---|---|
| Supervised | | | | | | |
| CTC Transf | — | CLM + Transf. | 2.20 | 4.94 | 2.47 | 5.45 |
| S2S Transf. | — | CLM + Transf. | 2.10 | 4.79 | 2.33 | 5.17 |
| Transf. Transducer | — | Transf. | — | — | 2.0 | 4.6 |
| ContextNet | — | LSTM | 1.9 | 3.9 | 1.9 | 4.1 |
| Conformer | — | LSTM | 2.1 | 4.3 | 1.9 | 3.9 |
| Semi-supervised | | | | | | |
| CTC Transf. + PL | LV-60k | CLM + Transf. | 2.10 | 4.79 | 2.33 | 4.54 |
| S2S Transf. + PL | LV-60k | CLM + Transf. | 2.00 | 3.65 | 2.09 | 4.11 |
| Iter. pseudo-labeling | LV-60k | 4-gram + Transf. | 1.85 | 3.26 | 2.10 | 4.01 |
| Noisy student | LV-60k | LSTM | 1.6 | 3.4 | 1.7 | 3.4 |
| This work | | | | | | |
| LARGE - from scratch | — | Transf. | 1.7 | 4.3 | 2.1 | 4.6 |
| BASE | LS-960 | Transf. | 1.8 | 4.7 | 2.1 | 4.8 |
| LARGE | LS-960 | Transf. | 1.7 | 3.9 | 2.0 | 4.1 |
| | LV-60k | Transf. | 1.6 | 3.0 | 1.8 | 3.3 |

The embodiments disclosed herein also evaluate the performance when large quantities of labeled speech are available to assess the effectiveness of our approach in a high resource setup. Specifically, the embodiments disclosed herein fine-tune the same models as before on the full 960 hours of labeled Librispeech: BASE and LARGE pre-trained on LS-960 as well as LARGE pre-trained on LV-60k.

Table 2 shows that our approach achieves WER 1.8/3.3 on test-clean/other on the full Librispeech benchmark. This is despite a weaker baseline architecture: supervised training of our architecture achieves WER 2.1/4.6 (LARGE—from scratch) compared to WER 1.9/4.1 for ContextNet, the baseline architecture of the state of the art. The embodiments disclosed herein use a simple Transformer with CTC which does not perform as well as seq2seq models.

Note that the vocabulary of our acoustic model (characters) does not match the vocabulary of the LM (words) which delays feedback from the LM and is likely to be detrimental. Most recent work uses the better performing word pieces for both models. Moreover, our result is achieved without any data balancing. Finally, self-training is likely complimentary to pre-training and their combination may yield even better results.

Next, the embodiments disclosed herein evaluate accuracy on TIMIT phoneme recognition by fine-tuning the pre-trained models on the labeled TIMIT training data. The embodiments disclosed herein fine-tune as for the 10-hour subset of Libri-light but do not use a language model. Table 3 shows that our approach can achieve a new state of the art on this dataset, reducing PER by a relative 23%/29% over the next best result on the dev/test sets. Other recent work on pre-training which evaluates on TIMIT may solve multiple tasks to learn good representations of speech.

TABLE 3

TIMIT phoneme recognition accuracy in terms of phoneme error rate (PER).

| | | |
|---|---|---|
| CNN + TD-filterbanks | 15.6 | 18.0 |
| PASE+ | — | 17.2 |
| Li-GRU + fMLLR | — | 14.9 |
| wav2vec | 12.9 | 14.7 |
| vq-wav2vec | 9.6 | 11.6 |
| This work (no LM) | | |
| LARGE (LS-960) | 7.4 | 8.3 |

TABLE 4

Average WER and standard deviation on combined dev-clean/other of Librispeech for three training seeds. The embodiments disclosed herein ablate quantizing the context network input and the targets in the contrastive loss.

| | | |
|---|---|---|
| Continuous inputs, quantized targets (Baseline) | 7.97 | 0.02 |
| Quantized inputs, quantized targets | 12.18 | 0.41 |
| Quantized inputs, continuous targets | 11.18 | 0.16 |
| Continuous inputs, continuous targets | 8.58 | 0.08 |

A difference to previous work may be that we quantize the latent audio representations only for the contrastive loss, i.e., when latents are used as targets, but not when the latents are input to the Transformer network. The embodiments disclosed herein motivate this choice by an ablating for which we adopt a reduced training setup to increase experimental turn around: the embodiments disclosed herein pre-train BASE on LS-960 for 250k updates with masking probability p=0.075, fine-tune on train-10h for 60k updates on a single GPU with 640k samples per batch, or 40 sec of speech audio. The embodiments disclosed herein report the average WER and standard deviation on the concatenation of dev-clean and dev-other (dev PER) for three seeds of fine-tuning.

Table 4 shows that our strategy of continuous inputs with quantized targets (Baseline) performs best. Continuous latent speech representations retain more information to enable better context representations and quantizing the target representations leads to more robust training. Quantizing the latent speech representations both in the input and the targets performs least well and may explain the lower performance of prior work. Continuous targets reduce the effectiveness of self-supervised training since targets may capture detailed artifacts of the current sequence, e.g. speaker and background information, which may make the task easier and prevent the model from learning general representations beneficial to speech recognition. The training accuracy of identifying the correct latent audio representation increases from 62% to 78.0% when switching from quantized to continuous targets. Continuous inputs and continuous targets perform second best but various attempts to improve it did not lead to better.

Next, the embodiments disclosed herein show more details on masking. When choosing which time-steps to mask, each latent speech representation in an utterance may be considered a candidate starting time-step with probability p where M is the length of each masked span starting from the respective time-step; both are hyper-parameters. Sampled starting time-steps may be expanded to length M and spans may overlap.

Figure 3:
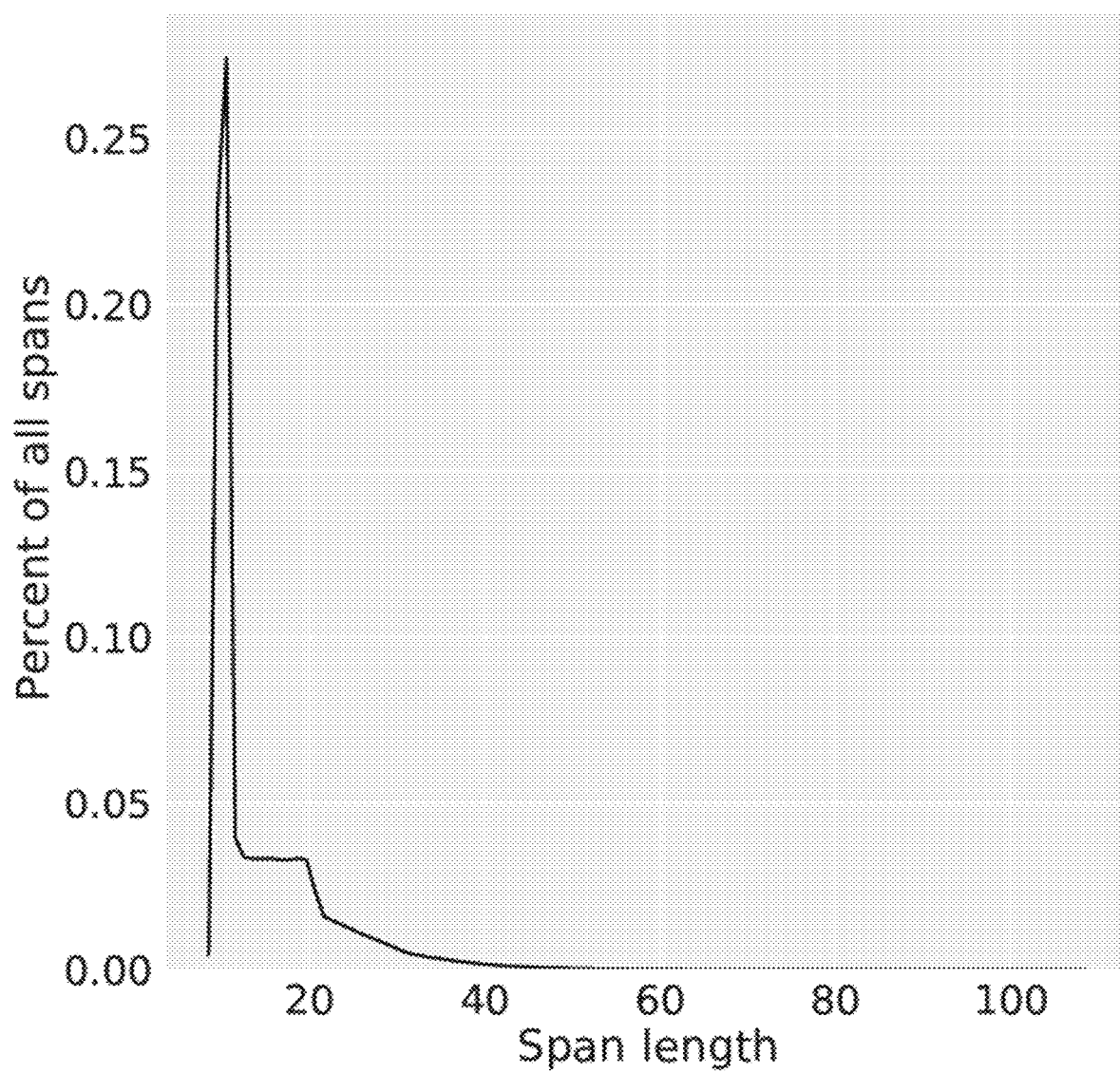
FIG. 3 illustrates an example mask length distribution for a 15-second sample with p=0.065 and M=10.

FIG. 3 illustrates an example mask length distribution for a 15-second sample with p=0.065 and M=10. For a 15-second long audio sample, the average mask length is 14.7 time-steps, corresponding to 299ms of audio, with a median of 10 time-steps, and a maximum of about 100 time-steps; about 49% of all time-steps in the sample will be masked. A plot of the corresponding mask length distribution is shown in FIG. 3 and an ablation of M and p as well as the effect of other masking strategies is shown in Table 5. Reducing M results in increased prediction accuracy for the self-supervised but the task becomes trivial when spans with length-one are masked, leading to poor performance on downstream speech recognition tasks. The embodiments disclosed herein also consider other masking strategies: w/o overlap uniform (a, b) samples for each starting index a span length $M^s$ from interval a to b and masks the subsequent $M_s$ time-steps taking care not to overlap with existing spans; poisson ($\lambda$) and normal ($\mu$, $\sigma$) sample $M^s$ from Poisson and normal distributions.

TABLE 5

Ablations on settings for the masking strategy during pre-training. When masking without overlap, the embodiments disclosed herein choose starting time-steps with p = 0.037 which results in the total number of masked tokens to match the baseline.

| | avg WER | std |
|---|---|---|
| Baseline (p = 0.075) | 7.97 | 0.02 |
| Mask length M = 8 | 8.33 | 0.05 |
| Mask length M = 12 | 8.19 | 0.08 |
| Mask length M = 15 | 8.43 | 0.19 |
| Mask probability p = 0.065 | 7.95 | 0.08 |
| Mask probability p = 0.06 | 8.14 | 0.22 |
| Mask w/o overlap, uniform(1, 31) | 8.39 | 0.02 |
| Mask w/o overlap, uniform(10, 30) | 9.17 | 0.05 |
| Mask w/o overlap, poisson(15) | 8.13 | 0.04 |
| Mask w/o overlap, normal(15, 10) | 8.37 | 0.03 |
| Mask w/o overlap, length 10 | 9.15 | 0.02 |
| Mask w/o overlap, length 15 | 9.43 | 0.26 |

Next, the embodiments disclosed herein show more details of how to mask the feature encoder representations. During fine-tuning we may apply a masking strategy to the feature encoder outputs similar to SpecAugment: the embodiments disclosed herein randomly choose a number of starting time-steps for which a span of ten subsequent time-steps is replaced with a mask embedding; spans may overlap and the embodiments disclosed herein use the same masked time-step embedding as during pre-training. The embodiments disclosed herein may also mask channels by choosing a number of channels as starting indices and then expand each one to cover the subsequent 64 channels. Spans may overlap and the selected channel spans may be set to zero value. The embodiments disclosed herein may use LayerDrop at a rate of 0.05 for BASE and 0.1 for LARGE during fine-tuning.

Table 6 summarizes the fine-tuning hyper-parameter settings used for the different labeled data setup. Table 7 shows the decoding parameters used for final evaluations of the various labeled data setups for Librispeech pre-trained models and Table 8 shows decoding parameters for LibriVox.

TABLE 6

Fine-tuning hyperparameters

| | timestep mask prob. | channel mask prob. | updates |
|---|---|---|---|
| 10 min | 0.075 | 0.008 | 12k |
| 1 hour | 0.075 | 0.004 | 13k |
| 10 hours | 0.065 | 0.004 | 20k |
| 100 hours | 0.05 | 0.008 | 50k |
| 960 hours | 0.05 | 0.0016 | 320k |
| TIMIT | 0.065 | 0.012 | 40k |

TABLE 7

Decoding parameters for Librispeech subsets for models pre-trained on Libri speech

| | 4 gram LM weight | 4 gram word insert. | TransLM weight | TransLM word insert. |
|---|---|---|---|---|
| 10 min | 3.23 | −0.26 | 1.20 | −1.39 |
| 1 hour | 2.90 | −1.62 | 1.15 | −2.08 |
| 10 hours | 2.46 | −0.59 | 1.06 | −2.32 |
| 100 hours | 2.15 | −0.52 | 0.87 | −1.00 |
| 960 hours | 1.74 | 0.52 | 0.92 | −0.86 |

TABLE 8

Decoding parameters for Librispeech subsets for models pre-trained on Librivox

| | 4 gram LM weight | 4 gram word insert. | TransLM weight | TransLM word insert. |
|---|---|---|---|---|
| 10 min | 3.86 | −1.18 | 1.47 | −2.82 |
| 1 hour | 3.09 | −2.33 | 1.33 | −0.69 |
| 10 hours | 2.12 | −0.90 | 0.94 | −1.05 |
| 100 hours | 2.15 | −0.52 | 0.87 | −1.00 |
| 960 hours | 1.57 | −0.64 | 0.90 | −0.31 |

Next, the embodiments disclosed herein show results with no language model at all as well as with an n-gram language model.

TABLE 9

WER on the Librispeech dev/test sets when training on the Libri-light low-resource labeled data setups (cf. Table 1).

| | | | dev | | test | |
|---|---|---|---|---|---|---|
| Model | Unlabeled data | LM | clean | other | clean | other |
| 10 min labeled | | | | | | |
| BASE | LS-960 | None | 46.1 | 51.5 | 46.9 | 50.9 |
| | | 4-gram | 8.9 | 15.7 | 9.1 | 15.6 |
| | | Transf. | 6.6 | 13.2 | 6.9 | 12.9 |
| LARGE | LS-960 | None | 43.0 | 46.3 | 43.5 | 45.3 |
| | | 4-gram | 8.6 | 12.9 | 8.9 | 13.1 |
| | | Transf. | 6.6 | 10.6 | 6.8 | 10.8 |
| LARGE | LV-60k | None | 38.3 | 41.0 | 40.2 | 38.7 |
| | | 4-gram | 6.3 | 9.8 | 6.6 | 10.3 |
| | | Transf. | 4.6 | 7.9 | 4.8 | 8.2 |

TABLE 9-continued

WER on the Librispeech dev/test sets when training on the Libri-light low-resource labeled data setups (cf. Table 1).

| | | | dev | | test | |
|---|---|---|---|---|---|---|
| Model | Unlabeled data | LM | clean | other | clean | other |
| 1 h labeled | | | | | | |
| BASE | LS-960 | None | 24.1 | 29.6 | 24.5 | 29.7 |
| | | 4-gram | 5.0 | 10.8 | 5.5 | 11.3 |
| | | Transf. | 3.8 | 9.0 | 4.0 | 9.3 |
| LARGE | LS-960 | None | 21.6 | 25.3 | 22.1 | 25.3 |
| | | 4-gram | 4.8 | 8.5 | 5.1 | 9.4 |
| | | Transf. | 3.8 | 7.1 | 3.9 | 7.6 |
| LARGE | LV-60k | None | 17.3 | 20.6 | 17.2 | 20.3 |
| | | 4-gram | 3.6 | 6.5 | 3.8 | 7.1 |
| | | Transf. | 2.9 | 5.4 | 2.9 | 5.8 |
| 10 h labeled | | | | | | |
| BASE | LS-960 | None | 10.9 | 17.4 | 11.1 | 17.6 |
| | | 4-gram | 3.8 | 9.1 | 4.3 | 9.5 |
| | | Transf. | 2.9 | 7.4 | 3.2 | 7.8 |
| LARGE | LS-960 | None | 8.1 | 12.0 | 8.0 | 12.1 |
| | | 4-gram | 3.4 | 6.9 | 3.8 | 7.3 |
| | | Transf. | 2.9 | 5.7 | 3.2 | 6.1 |
| LARGE | LV-60k | None | 6.3 | 9.8 | 6.3 | 10.0 |
| | | 4-gram | 2.6 | 5.5 | 3.0 | 5.8 |
| | | Transf. | 2.4 | 4.8 | 2.6 | 4.9 |
| 100 h labeled | | | | | | |
| BASE | LS-960 | None | 6.1 | 13.5 | 6.1 | 13.3 |
| | | 4-gram | 2.7 | 7.9 | 3.4 | 8.0 |
| | | Transf. | 2.2 | 6.3 | 2.6 | 6.3 |
| LARGE | LS-960 | None | 4.6 | 9.3 | 4.7 | 9.0 |
| | | 4-gram | 2.3 | 5.7 | 2.8 | 6.0 |
| | | Transf. | 2.1 | 4.8 | 2.3 | 5.0 |
| LARGE | LV-60k | None | 3.3 | 6.5 | 3.1 | 6.3 |
| | | 4-gram | 1.8 | 4.5 | 2.3 | 4.6 |
| | | Transf. | 1.9 | 4.0 | 2.0 | 4.0 |

TABLE 10

WER on Librispeech when using all 960 hours of Librispeech as labeled data (cf. Table 2).

| | | | dev | | test | |
|---|---|---|---|---|---|---|
| Model | Unlabeled data | LM | clean | other | clean | other |
| LARGE - from scratch | — | None | 2.8 | 7.6 | 3.0 | 7.7 |
| | — | 4-gram | 1.8 | 5.4 | 2.6 | 5.8 |
| | — | Transf. | 1.7 | 4.3 | 2.1 | 4.6 |
| BASE | LS-960 | None | 3.2 | 8.9 | 3.4 | 8.5 |
| | | 4-gram | 2.0 | 5.9 | 2.6 | 6.1 |
| | | Transf. | 1.8 | 4.7 | 2.1 | 4.8 |
| LARGE | LS-960 | None | 2.6 | 6.5 | 2.8 | 6.3 |
| | | 4-gram | 1.7 | 4.6 | 2.3 | 5.0 |
| | | Transf. | 1.7 | 3.9 | 2.0 | 4.1 |
| LARGE | LV-60k | None | 2.1 | 4.5 | 2.2 | 4.5 |
| | | 4-gram | 1.4 | 3.5 | 2.0 | 3.6 |
| | | Transf. | 1.6 | 3.0 | 1.8 | 3.3 |

Next, the embodiments disclosed herein show an analysis of how the discrete latent speech representations related to phonemes. The embodiments disclosed herein investigate whether the discrete latent speech representations $q_t$ learned by the quantizer relate to phonetic information: using LARGE pre-trained on LV-60k and without any fine-tuning, the embodiments disclosed herein compute the discrete latents for the training data of TIMIT and compute the co-occurrence between human annotated phonemes and the latents. Ties are broken by choosing the phoneme which is most represented in the receptive field of $q_t$. The training data contains 3696 utterances of average length 13.6 sec, or 563k discrete latents.

Figure 4:
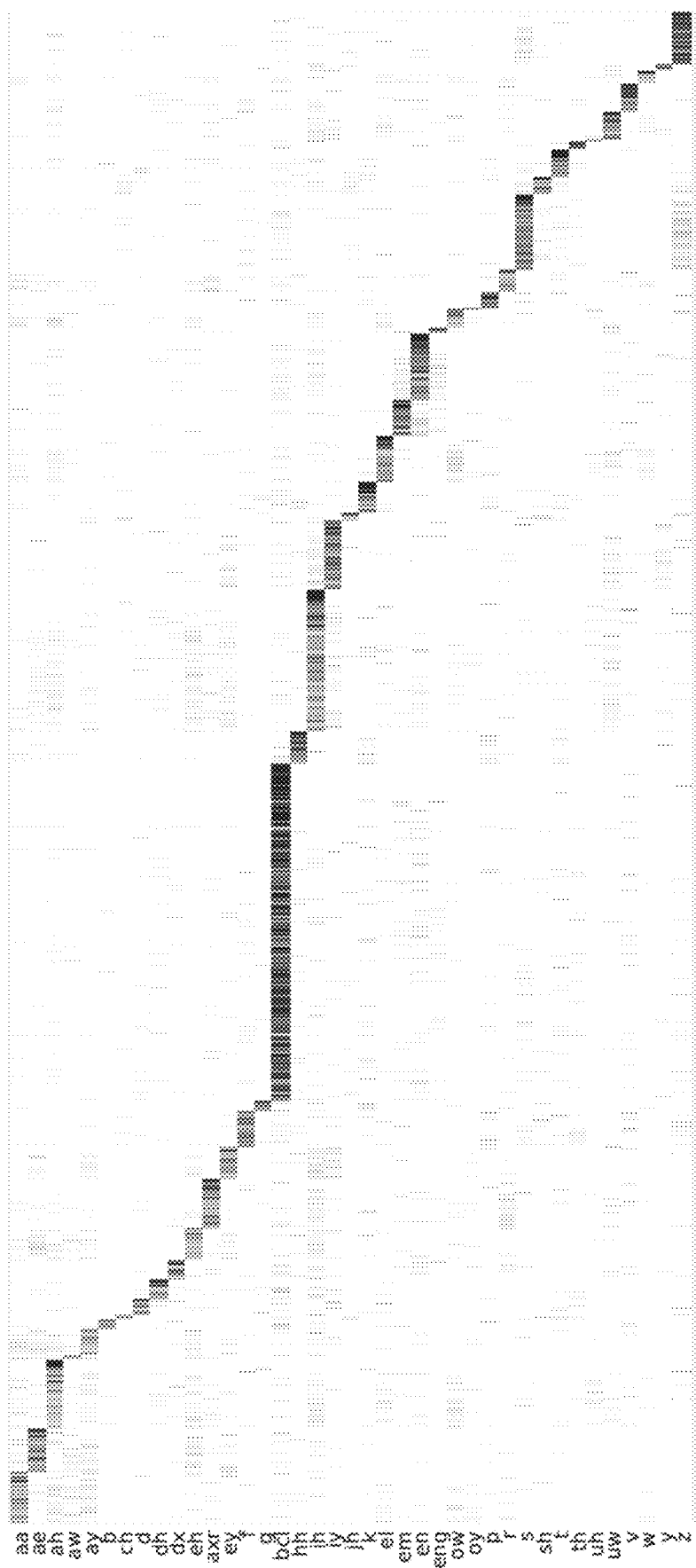
FIG. 4 illustrates an example visualization of the co-occurrence between discrete latent speech representations and phonemes.

FIG. 4 illustrates an example visualization of the co-occurrence between discrete latent speech representations and phonemes. We plot the conditional probability P(phoneme|$q_t$) on TIMIT train data. The y-axis shows the collapsed 39 classes of phonemes and the x-axis is over the different discrete latents. FIG. 4 shows that many discrete latent speech representations appear to specialize in specific phonetic sounds. The silence phoneme (bcl) represents 22% of all human annotated speech data and is therefore also modeled by many different latent speech representations.

Next, the embodiments disclosed herein show various ablation experiments on various hyperparameters. Table 11 ablates various hyperparameter choices of our architecture. First, the embodiments disclosed herein tried to improve the continuous input and continuous target model by adding an MLP on top of the continuous target representation and the embodiments disclosed herein also tried to use a separate set of encoder parameters for the representations used as input and targets (Separate encoders). Both did not lead to meaningful improvements.

Increasing the receptive field size from 25ms to 30ms had little effect. Setting the diversity penalty weight (a) too low results in lower codebook usage and lower performance. Setting it too high leads to slight instability. Doubling the number of relative positional embeddings to 256 also did not help. Stopping gradients from the quantizer to the encoder shows that the encoder requires training signal from the quantizer as well.

Next, increasing the number of negatives did not result in better performance (K=200) and sampling negatives from the entire batch of utterances hurt performance, likely because candidates from other utterances are easy to distinguish. Sampling negatives from any time-step in the utterance, masked or unmasked, does not help and is more computationally expensive. Gumbel noise is important and increasing the number of codebooks did not result in better performance.

TABLE 11

Ablation of various hyper-parameter choices. The embodiments disclosed herein report average WER and standard deviation on combined dev-clean/other of Librispeech for three seeds of training.

|  | avg. WER | std. |
|---|---|---|
| Baseline (p = 0.075, $\alpha$ = 0.1) | 7.97 | 0.02 |
| Continuous inputs, continuous targets | 8.58 | 0.08 |
| +MLP on targets | 8.51 | 0.05 |
| +Separate encoders | 8.90 | 0.01 |
| receptive field 30 ms | 7.99 | 0.06 |
| diversity penalty |  |  |
| $\alpha$ = 0 | 8.48 | 0.08 |
| $\alpha$ = 0.05 | 8.34 | 0.08 |
| $\alpha$ = 0.2 | 8.58 | 0.45 |
| Conv pos emb, kernel 256 | 8.14 | 0.05 |
| No gradient to encoder from quantizer | 8.41 | 0.08 |
| Negatives |  |  |
| K = 200 same utterance | 8.12 | 0.05 |
| K = 50 same utterance + K = 50 from batch | 8.79 | 0.06 |
| Sample negatives from any time-step | 8.07 | 0.02 |
| No Gumbel noise | 8.73 | 0.42 |
| Codebook |  |  |
| G = 4, V = 18 | 9.02 | 0.38 |
| G = 8, V = 8 | 8.13 | 0.07 |

TABLE 11-continued

Ablation of various hyper-parameter choices. The embodiments disclosed herein report average WER and standard deviation on combined dev-clean/other of Librispeech for three seeds of training.

|  | avg. WER | std. |
|---|---|---|
| Predict exactly U time-steps from edges |  |  |
| U = 1 | 9.53 | 0.91 |
| U = 5 | 8.19 | 0.07 |
| U = 10 | 8.07 | 0.07 |
| U = 15 | 7.89 | 0.10 |
| U = 20 | 7.90 | 0.01 |

The embodiments disclosed herein also investigated predicting only time-steps immediately next to the last unmasked time-step for each span. This may enable to better control the difficulty of the pre-training task. Given the leftmost or rightmost unmasked time-step next to a masked span, the embodiments disclosed herein compute the contrastive loss only for the first U masked time-steps next to these unmasked spans. Predicting only up to one time-step performs poorly because there is little training signal from each utterance and predicting more time-steps performs better but does not significantly outperform predicting all masked time-steps. Increasing the number of training updates helps but this increases training time.

The embodiments disclosed herein further conduct the following experiments to evaluate the effectiveness of our approach in a cross-lingual setting. The embodiments first show that our approach may be effective for learning generic cross-lingual representations in an unsupervised way. Pre-training a single model on multiple languages significantly outperforms the previous state of the art, as well as our own monolingual models. Second, the embodiments disclosed herein demonstrate the positive impact of cross-lingual transfer on low-resource languages and provide a better understanding of the trade-off between high-resource and low-resource languages. Third, by fine-tuning a multilingual model on many languages at once, the embodiments disclosed herein may obtain a single model for all languages with strong performance. Finally, the embodiments disclosed herein analyze the impact of language similarity on cross-lingual transfer, and show that, to some extent, our multilingual pretrained model implicitly learns to cluster related languages.

The experiments are based on the following datasets. The CommonVoice dataset is a multilingual corpus of read speech comprising more than two thousand hours of speech data in 38 languages. The amount of data per language ranges from three hours for Swedish ("low-resource") to 353 hours for French and 1350 hours for English ("high-resource"). The embodiments disclosed herein consider ten languages: Spanish (es), French (fr), Italian (it), Kyrgyz (ky), Dutch (du), Russian (ru), Swedish (sv), Turkish (tr), Tatar (tt) and Chinese (zh); as well as English (en) for pretraining. The embodiments disclosed herein use the November 2019 release for training models, and for fine-tuning the embodiments disclosed herein use the evaluation splits from a prior work which include one hour labeled data for training, 20 minutes for validation and one hour for testing. This few-shot evaluation dataset consists of phoneme sequences as output and the embodiments disclosed herein report phone error rate (PER) similar to prior work. This BABEL dataset is a multilingual corpus of conversational telephone speech from the IARPA program, which includes Asian and African languages. The embodiments disclosed herein adopt the same data setup as a prior work and pretrain on ten languages: Bengali (bn), Cantonese (zh), Georgian (ka), Haitian (ht), Kurmanji (ku), Pashto (ps), Tamil (ta), Turkish (tr), Tokpisin (tp), Vietnamese (vi). The embodiments disclosed herein evaluate cross-lingual transfer on four other languages, i.e., models are not pretrained on these languages: Assamese (as), Tagalog (tl), Swahili (sw), Lao (lo). The embodiments disclosed herein train a multilingual model in ten languages and monolingual models in 14 languages. The embodiments disclosed herein use the same speech audio for pretraining and fine-tuning, and no unlabeled speech provided by BABEL. The embodiments disclosed herein use the dev folder of the BABEL dataset as our test set as "eval" has not been open-sourced and use 10% of the training set as dev data. The embodiments disclosed herein report character error rate (CER). All audio is resampled to 16kHz. For comparison only, the embodiments disclosed herein train 4-gram n-gram language models on CommonCrawl data for Assamese (140MiB of text data), Swahili (2GiB), Tamil (4.8GiB) and Lao (763MiB); for this experiment only the embodiments disclosed herein report word error rate (WER).

The embodiments disclosed herein use the Base architecture unless otherwise stated. For CommonVoice, the embodiments disclosed herein pretrain an English model on 1350h, and ten monolingual models on each pretraining set. For comparison with the English model, the embodiments disclosed herein train Base and Large multilingual models on 1350h of data: 793h of speech audio from the 10 evaluation languages plus 557h of English audio. The embodiments disclosed herein up-sample low-resource languages with a=0.5 and train a model with a=1 for comparison (unbalanced). For multilingual fine-tuning, the embodiments disclosed herein either separate or share phoneme vocabularies across languages.

For BABEL, the embodiments disclosed herein train a monolingual model on each of the 14 languages, as well as a Base and Large multilingual model on a total of 650 hours of speech audio in ten languages. Since the amount of data in each language is more balanced than for CommonVoice, the embodiments disclosed herein use a=1. The same speech audio is used for pretraining and fine-tuning and we use separate character sets for multilingual fine-tuning.

In what follows, the embodiments disclosed herein compare our model to several baselines and show that unsupervised cross-lingual representation learning may be very effective. The embodiments disclosed herein provide a comprehensive analysis of the impact of different pretraining methods on automatic speech recognition in Tables 12, 13 and 14.

The embodiments disclosed herein first compare monolingual (our model-Monolingual) to multilingual (our model-10) pretrained models (Base) fine-tuned individually on each language (ft=1). On CommonVoice, our model-10 obtains 13.6 PER on average (Avg), a relative PER reduction of 49% compared to our model-Monolingual (Table 12). On BABEL, XLSR-10 improves over our model-Monolingual by 18% relative CER (Table 13) and by more over supervised training (Training from scratch). Pretraining on multiple languages results in cross-lingual transfer and better speech representations.

Compared to prior work, our model-10 Large reduces PER by 72% relative to m-CPC on Common-Voice (Table 12). On BABEL, comparison to prior work is challenging because most work evaluates on the eval set, only available to IARPA BABEL participants who tune on the public dev set which non-participants use as test set. This makes comparison difficult. Since the embodiments disclosed herein adopted the same data setup as a prior work, we compare to their supervised multilingual model: our model-10 Large reduces CER by 38% relative to multi-BLSTMP+VGG (Table 13). Table 15 shows a relative word error reduction of 16% compared to a monolingual baseline (BLSTM-HMM) which even outperforms a supervised multilingual model (Multi-10).

TABLE 12

CommonVoice results using phoneme error rate (PER). The embodiments disclosed herein pretrain models on either one language (pt = 10); or 10 languages (pt = 10); and fine-tune on each language (ft = 1) or all languages (ft = 10). D indicates the pretraining data, LS for English LibriSpeech (100 h or 360 h), $BBL_{all}$ for BABEL (1070h), $CV_{En}$ for English CommonVoice (1350 h), $CV_{mo}$ for monolingual (see number of pretraining hours per language) and $CV_{all}$ for multilingual (1350 h). Languages can be high-resource (es, fr, it) or low-resource (e.g. ky, sv, tr, tt).

| Model | D | #pt | #ft | es | fr | it | ky | nl | ru | sv | tr | tt | zh | Avg |
|---|---|---|---|---|---|---|---|---|---|---|---|---|---|---|
| Number of pretraining hours per language | | | | 168 h | 353 h | 90 h | 17 h | 29 h | 55 h | 3 h | 11 h | 17 h | 50 h | 793 h |
| Number of fine-tuning hours per language | | | | 1 h | 1 h | 1 h | 1 h | 1 h | 1 h | 1 h | 1 h | 1 h | 1 h | 10 h |
| Baselines from previous work | | | | | | | | | | | | | | |
| m-CPC† | $LS_{100h}$ | 10 | 1 | 38.7 | 49.3 | 42.1 | 40.7 | 44.4 | 45.2 | 48.8 | 49.7 | 44.0 | 55.5 | 45.8 |
| m-CPC† | $LS_{360h}$ | 10 | 1 | 38.0 | 47.1 | 40.5 | 41.2 | 42.5 | 43.7 | 47.5 | 47.3 | 42.0 | 55.0 | 44.5 |
| Fer et al.† | $BBL_{all}$ | 10 | 1 | 36.6 | 48.3 | 39.0 | 38.7 | 47.9 | 45.2 | 52.6 | 43.4 | 42.5 | 54.3 | 44.9 |
| Our monolingual models | | | | | | | | | | | | | | |
| Our model-English | $CV_{en}$ | 1 | 1 | 13.7 | 20.0 | 19.1 | 13.2 | 19.4 | 18.6 | 21.1 | 15.5 | 11.5 | 27.1 | 17.9 |
| Our model-Monolingual | $CV_{mo}$ | 1 | 1 | 6.8 | 10.4 | 10.9 | 29.6 | 37.4 | 11.6 | 63.6 | 44.0 | 21.4 | 31.4 | 26.7 |
| Our multilingual models | | | | | | | | | | | | | | |
| Our model-10 (unbalanced) | $CV_{all}$ | 10 | 1 | 9.7 | 13.6 | 15.2 | 11.1 | 18.1 | 13.7 | 21.4 | 14.2 | 9.7 | 25.8 | 15.3 |
| Our model-10 | $CV_{all}$ | 10 | 1 | 9.4 | 14.2 | 14.1 | 8.4 | 16.1 | 11.0 | 20.7 | 11.2 | 7.6 | 24.0 | 13.6 |
| Our model-10 (separate vocab) | $CV_{all}$ | 10 | 10 | 10.0 | 13.8 | 14.0 | 8.8 | 16.5 | 11.6 | 21.4 | 12.0 | 8.7 | 24.5 | 14.1 |
| Our model-10 (shared vocab) | $CV_{all}$ | 10 | 10 | 9.4 | 13.4 | 13.8 | 8.6 | 16.3 | 11.2 | 21.0 | 11.7 | 8.3 | 24.5 | 13.8 |
| Our multilingual models (Large) | | | | | | | | | | | | | | |
| Our model-10 | $CV_{all}$ | 10 | 1 | 7.9 | 12.6 | 11.7 | 7.0 | 14.0 | 9.3 | 20.6 | 9.7 | 7.2 | 22.8 | 12.3 |
| Our model-10 (separate vocab) | $CV_{all}$ | 10 | 10 | 8.1 | 12.1 | 11.9 | 7.1 | 13.9 | 9.8 | 21.0 | 10.4 | 7.6 | 22.3 | 12.4 |
| Our model-10 (shared vocab) | $CV_{all}$ | 10 | 10 | 7.7 | 12.2 | 11.6 | 7.0 | 13.8 | 9.3 | 20.8 | 10.1 | 7.3 | 22.3 | 12.2 |

To isolate the impact of multilingual training versus simply training on more data, the embodiments disclosed herein pretrain an English-only CommonVoice model (our model-English) on the same amount of data as the multilingual model (1350h) and compare the two. Table 1 shows that on average, our model-English significantly improves over the monolingual models (average PER of 26.7 vs. 17.9 PER) but multilingual pretraining performs even better at 13.6 PER, a 24% relative PER reduction over our model-English. This shows that adding more training data may be not the only reason for the improved accuracy: the similarity between the languages used in pretraining and fine-tuning may also play an important role.

To better assess the cross-lingual transfer of the learned representations, the embodiments disclosed herein evaluate our model-10 BABEL model on four languages not seen during pretraining. The embodiments disclosed herein fine-tune this model on each language and compare it to monolingual models pretrained specifically on these languages. Table 3 shows that a multilingual model not pretrained on any data from the four languages, still outperforms our model-Monolingual, reducing average CER from 29 to 22.8 which compares to results from previous work of 36.8 CER. This further suggests that the learned representations may capture generic features of the speech signal which transfer to many languages.

The embodiments disclosed herein examine several properties of unsupervised cross-lingual representation learning for speech recognition. The embodiments disclosed herein show that it may be particularly effective on low-resource languages, then describe the transfer-interference trade-off which benefits low resource languages but hurts high resource languages. Finally, the embodiments disclosed herein show that adding capacity is important for multilingual pretraining.

thus high-resource, while Swedish and Turkish have 3h and 11h and are low-resource. Monolingual models perform poorly on low-resource languages but this is where cross-lingual transfer is most effective: our model-10 reduces PER over our model-Monolingual by a relative 67% on Swedish, 72% on Turkish, 72% on Kyrgyz, and 64% on Tatar.

On BABEL, the amount of monolingual data ranges between 30 hours for Swahili and 130 hours for Cantonese, with a mean of 65h per language. The results (Table 13 and 14) show that the multilingual model outperforms the monolingual model on all languages, but the biggest gains are obtained on the four lowest-resource languages: Georgian (ka), Kurmanji (ku), Tokpisin (tp) and Swahili (sw).

The results per language on CommonVoice (Table 12) show what is known as the transfer-interference trade-off: for low-resource languages (e.g. ky, nl, sv, tr, tt), multilingual models outperform monolingual models because of positive transfer, however multilingual models perform worse on high-resource languages (es, fr, it), due to interference. Data from multiple languages enables better speech representations that transfer to low-resource languages but the model also needs to share its capacity across languages which degrades performance on high-resource languages.

For a given model capacity, the language sampling parameter controls this trade-off Table 12 shows that training according to the true language distribution, our model-10 (unbalanced) using=1, performs less well than our model-10, where more capacity is allocated to low-resource languages via=0.5. The sole exception being French, the language with the most data. On average the unbalanced model obtains 15.3 PER while the balanced model obtains 13.6.

The interference problem may be alleviated by adding more capacity to the multilingual model: the gap between multilingual models and monolingual models for high-resource languages may be reduced by increasing model

TABLE 13

BABEL results using character error rate (CER) on in-pretraining languages. Our baseline results use the same amount of data as our multilingual models.

| Model | #pt | #ft | bn | zh | ka | ht | ku | ps | ta | tr | tp | vi | Avg |
|---|---|---|---|---|---|---|---|---|---|---|---|---|---|
| Number of pretraining hour per language | | | 56 h | 130 h | 46 h | 61 h | 38 h | 71 h | 63 h | 70 h | 36 h | 79 h | 650 h |
| Number of fine-tuning hours per language | | | 56 h | 130 h | 46 h | 61 h | 38 h | 71 h | 63 h | 70 h | 36 h | 79 h | 650 h |
| Baseline from previous work | | | | | | | | | | | | | |
| Mono-BLSTMP | 10 | 1 | 43.4 | 37.4 | 35.4 | 39.7 | 55.0 | 37.3 | 55.3 | 50.3 | 32.7 | 54.3 | 44.1 |
| Multi-BLSTMP | 10 | 1 | 42.9 | 36.3 | 38.9 | 38.5 | 52.1 | 39.0 | 48.5 | 36.4 | 31.7 | 41.0 | 40.5 |
| +VGG | 10 | 1 | 39.6 | 34.3 | 36.0 | 34.5 | 49.9 | 34.7 | 45.5 | 28.7 | 33.7 | 37.4 | 37.4 |
| Our monolingual models | | | | | | | | | | | | | |
| Training from scratch | 1 | 1 | 47.6 | 42.7 | 45.0 | 45.0 | 58.4 | 43.2 | 55.7 | 44.6 | 45.2 | 43.6 | 47.1 |
| Our model-Monolingual | 1 | 1 | 31.8 | 28.0 | 30.5 | 274.9 | 46.9 | 25.5 | 36.0 | 26.1 | 26.8 | 25.2 | 30.5 |
| Our multilingual models | | | | | | | | | | | | | |
| Our model-10 | 10 | 1 | 26.6 | 24.7 | 21.8 | 23.2 | 38.2 | 22.6 | 30.5 | 22.3 | 17.3 | 21.7 | 24.9 |
| Our model-10 (separate vocab) | 10 | 10 | 29.5 | 29.1 | 25.9 | 26.5 | 40.4 | 25.8 | 33.4 | 24.6 | 19.3 | 24.3 | 27.9 |
| Our multilingual models (Large) | | | | | | | | | | | | | |
| Our model-10 | 10 | 1 | 25.1 | 23.4 | 19.7 | 21.1 | 36.8 | 21.6 | 28.6 | 19.8 | 16.1 | 19.9 | 23.2 |
| Our model-10 (separate vocab) | 10 | 10 | 25.8 | 25.0 | 20.7 | 22.0 | 37.2 | 21.2 | 28.9 | 19.9 | 15.9 | 20.7 | 23.7 |

Unsupervised cross-lingual representation learning and cross-lingual transfer may be particularly effective on low-resource languages. On CommonVoice, the separation between high-resource and low-resource languages may be more salient than for BABEL. The embodiments disclosed herein distinguish between low-resource and high-resource based on the amount of available unlabeled speech data. For example, French and Spanish have 353h and 168h and are capacity. The embodiments disclosed herein only study the impact of adding more capacity to the multilingual model, by training an our model-10 Large model. On CommonVoice, the Large model reduces PER by relative 9.6% compared to Base, reducing average PER from 13.6 to 12.3. There are no gains on very low-resource languages like Swedish but significant gains on Spanish, French and Italian. On BABEL, average CER is reduced by a relative 6.8%.

This shows that the multilingual model benefits from more capacity overall, and in particular for high-resource languages.

TABLE 14

BABEL results on out-of-pretraining languages (CER). Our model-10 provides strong representations for languages not seen during pretraining, outperforming monolingual models pretrained specifically on these languages.

| Model | #pt | #ft | as | tl | sw | lo | Avg |
|---|---|---|---|---|---|---|---|
| Number of pretraining hours | | | 55 h | 76 h | 30 h | 59 h | 220 h |
| Number of dine-tuning hours | | | 55 h | 76 h | 30 h | 59 h | 220 h |
| Basline from previous work | | | | | | | |
| Monolingual | 10 | 1 | 45.6 | 43.1 | 33.1 | 42.1 | 41.0 |
| Stage-2 retraining | 10 | 1 | 41.3 | 37.9 | 29.1 | 38.7 | 36.8 |
| Our monolingual models | | | | | | | |
| Training from scratch | 1 | 1 | 50.2 | 41.7 | 40.8 | 43.5 | 44.1 |
| Our model-Nonolingual | 1 | 1 | 34.8 | 25.4 | 26.8 | 29.1 | 29.0 |
| Our multilingual models | | | | | | | |
| Our model-10 | 10 | 1 | 29.4 | 21.9 | 16.6 | 23.3 | 22.8 |
| Our model-10 (Large) | 10 | 1 | 27.7 | 19.6 | 14.9 | 21.8 | 21.0 |

TABLE 15

BABEL results on out-of-pretraining languages using word error rate (WER). Our model-10 reduces word error rate by 16.5% compared to previously published results on four of the BABEL languages. The embodiments disclosed herein report WER with and without 4-gram KenLM language models.

| Model | #pt | #ft | as | tl | sw | lo | Avg |
|---|---|---|---|---|---|---|---|
| Number of pretraining hours | | | 55 h | 76 h | 30 | 59 h | 220 h |
| Number of Fine-tuning hour | | | 55 h | 76 h | 30 h | 59 h | 220 h |
| Baselines from previous work | | | | | | | |
| Multi 10 29 | 10 | 1 | 53.6 | 46.2 | 41.6 | 45.9 | 46.8 |
| BLSTM-HIVIM 29 | 1 | 1 | 49.1 | 46.3 | 38.3 | 45.7 | 44.9 |
| Our approach (no LM) | | | | | | | |
| Our model-10 (Large) | 10 | 1 | 49.1 | 40.6 | 38.1 | 34.7 | 40.6 |
| Our approach (4-gram KenLM) | | | | | | | |
| Our model-10 (Large) | 10 | 1 | 44.9 | 37.3 | 35.5 | 32.2 | 37.5 |

When we fine-tune the pretrained model on each language individually, we end up with a different model for each language. On the other hand, multilingual speech recognition aims to build a single model for all languages that performs as well or better than individual monolingual models. Next, the embodiments disclosed herein investigate fine-tuning a single model on the labeled data of all languages (#ft=10) to obtain a single multilingual model instead of fine-tuning each language separately (#ft=1). Training batches are constructed by sampling audio samples from multiple languages (without up-sampling).

For CommonVoice the embodiments disclosed herein consider two settings since we use phonemes: separate phoneme vocabularies per languages as well as sharing phonemes across languages. A shared vocabulary reduces the number of modeled phonemes from 474 to 182 compared to separate vocabularies. Table 12 shows that the Base model with monolingual fine-tuning of our model-10 obtains 13.6 average PER which compares to 14.1 PER and 13.8 PER for separate and shared vocabulary multilingual fine-tuning respectively. When increasing model capacity (Large), multilingual fine-tuning is competitive to monolingual fine-tuning: 12.3 average PER (ft=1) vs. 12.4 and 12.2 average PER (ft=N) for separate and shared vocabularies. Multilingual fine-tuning of the Large model with a shared vocabulary achieves the best overall performance on CommonVoice.

BABEL provides significantly more labeled data (650h for all languages) compared to CommonVoice (10h for all languages). Performance on BABEL with multilingual fine-tuning of our model-10 Base model significantly decreases from 24.9 to 27.9 average CER compared to monolingual fine-tuning. However, increasing capacity helps to counteract this: our model-10 Large achieves 23.7 average CER which is much closer to monolingual fine-tuning of the Large model (23.2 avg. CER). Increasing capacity is particularly important when fine-tuning on large amounts of supervised data from many languages. Multilingual fine-tuning performs competitively to monolingual fine-tuning and enables us to have a single model for many languages.

TABLE 16

Impact of language similarity on cross-lingual transfer. The embodiments disclosed herein simulate a low-resource language scenario by using only 5 hours of Italian CommonVoice data and add 50 hours from another language for pretraining. The embodiments disclosed herein fine-tune on 1 hour of Italian supervised data.

| Model | #pt | #ft | it | it | es | de | en | ru | ka | zh |
|---|---|---|---|---|---|---|---|---|---|---|
| Number of pretraining hours | | | 5 h(it) | 5 h(it) + 50 h(<1lang>) | | | | | | |
| Our model-Monolingual | 1 | 1 | 47.6 | 16.8 | 24.3 | 25.4 | 27 | 27.2 | 28.1 | 30.6 |

Next, the embodiments disclosed herein study the impact of language similarity on cross-lingual transfer and then analyze the multilingual token embedding space where we find that languages are clustered.

The embodiments disclosed herein consider Italian as the low-resource language for which we assume only 5h of unlabeled data is available. The embodiments disclosed herein pretrain models on the 5h as well as 50h of unlabeled data from several other languages: Italian, Spanish, German, English, Russian, Kabyle and Chinese. Finally, the embodiments disclosed herein fine-tune each model on 1h of Italian labeled data. Table 16 shows that adding more unlabeled data helps overall, but adding data from related languages gives the largest improvement, e.g., Spanish. Distant languages, e.g., Kabyle or Chinese are less effective. In order to improve performance on a low-resource language, it may be best to add unlabeled data from a closely related language.

To analyze the shared quantized latent speech representations, or discrete tokens, the embodiments disclosed herein train two models: one on 12 languages of CommonVoice and another on 17 languages of BABEL. For each model, the embodiments disclosed herein run the quantizer of our model on train and dev speech samples from each language, and compute a frequency vector of the discrete tokens. The resulting frequencies are normalized for each language to obtain vectors of size V×G, the number of discrete latent speech representations. The vectors represent the empirical probability distribution over the shared discrete latents.

Next, the embodiments disclosed herein construct an affinity matrix between languages by computing the Jensen-Shannon symmetric similarity between vectors. Finally, the embodiments disclosed herein cluster languages using K-Means and then perform a PCA with two dimensions.

Figures 5A, 5B, 5C:
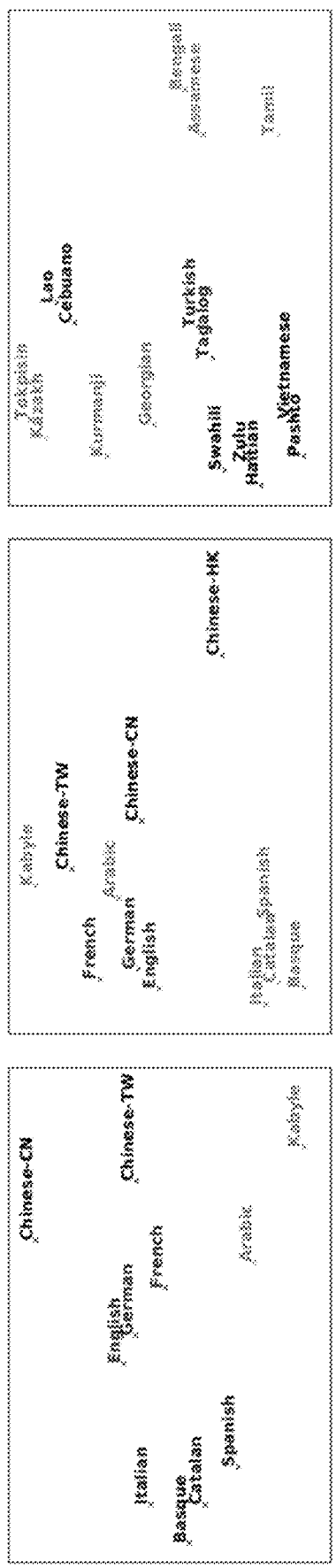
FIG. 5A illustrates an example visualization of the shared discrete latent speech representations across languages for a model trained on 12 Common-Voice languages (CV-12)
FIG. 5B illustrates an example visualization of adding Chinese-HongKong (zh-HK).
FIG. 5C illustrates an example visualization of clusters corresponding to similar languages like Bengali and Assamese.

FIG. 5A-5C illustrate example visualizations of language similarities learned by our model. FIG. 5A illustrates an example visualization of the shared discrete latent speech representations across languages for a model trained on 12 Common-Voice languages (CV-12). FIG. 5B illustrates an example visualization of adding Chinese-HongKong (zh-HK). FIG. 5B shows that adding Chinese-HongKong in shares relatively few latents with other languages. FIG. 5C illustrates an example visualization of clusters corresponding to similar languages like Bengali and Assamese. FIG. 5C is for a model trained on 17 BABEL languages. The clusters were obtained by K-Means. Note that we perform K-Means before PCA to avoid loss of information and that PCA may make some points appear closer than they are in original vectors. We see that the model shares more discrete tokens for similar languages, e.g., it groups Basque, Catalan, Spanish and Italian, or English, German and French, or Arabic and Kabyle (see FIG. 5A), and Mandarin (zh-CN and zh-TW), although this information is lost in the PCA visualization. FIG. 5B shows that the model may also isolate a language, such as Chinese-HongKong (Cantonese), which is not close to any other language because it shares fewer discrete tokens with other languages.

For BABEL (FIG. 5C), we also find language groupings such as Bengali/Assamese which belong to the same family, or Zulu and Swahili which both have long vowels. However, one could argue that Pashto and Kurmanji should be closer to each other since they are both Iranian languages. The purpose of this analysis is not to recover full language families but to better understand how our model allocates the latent representations across languages. Interestingly, Italian is closer to Spanish, the most effective language in the previous experiment (Table 16).

Figure 6:
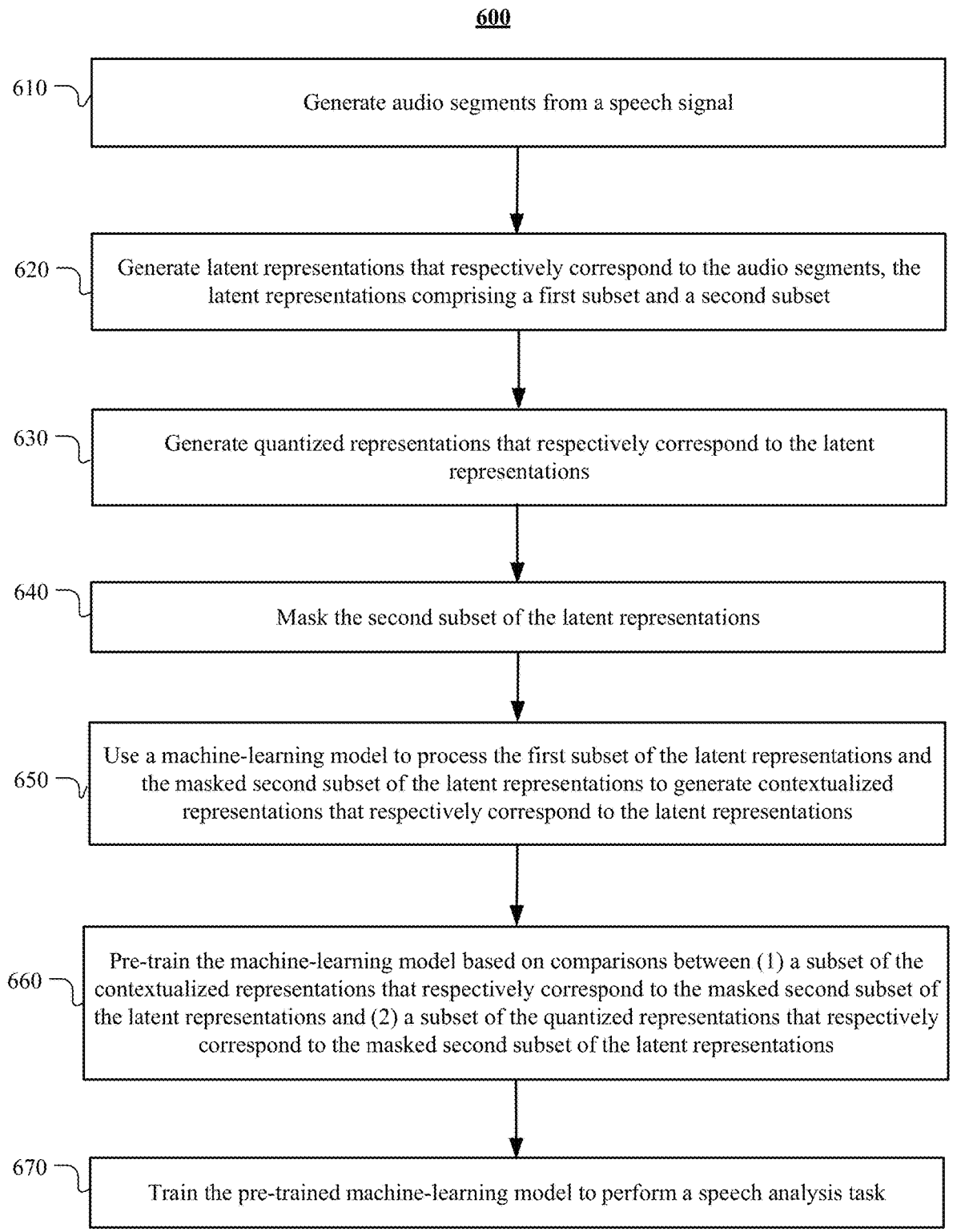
FIG. 6 illustrates an example method for learning representations of speech signals using self-supervised learning.

FIG. 6 illustrates an example method 600 for learning representations of speech signals using self-supervised learning. The method may begin at step 610, where the computing system may generate audio segments from a speech signal. At step 620, the computing system may generate latent representations that respectively correspond to the audio segments, the latent representations comprising a first subset and a second subset. At step 630, the computing system may generate quantized representations that respectively correspond to the latent representations. At step 640, the computing system may mask the second subset of the latent representations. At step 650, the computing system may use a machine-learning model to process the first subset of the latent representations and the masked second subset of the latent representations to generate contextualized representations that respectively correspond to the latent representations. At step 660, the computing system may pre-train the machine-learning model based on comparisons between (1) a subset of the contextualized representations that respectively correspond to the masked second subset of the latent representations and (2) a subset of the quantized representations that respectively correspond to the masked second subset of the latent representations. At step 670, the computing system may train the pre-trained machine-learning model to perform a speech analysis task. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for learning representations of speech signals using self-supervised learning including the particular steps of the method of FIG. 6, this disclosure contemplates any suitable method for learning representations of speech signals using self-supervised learning including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
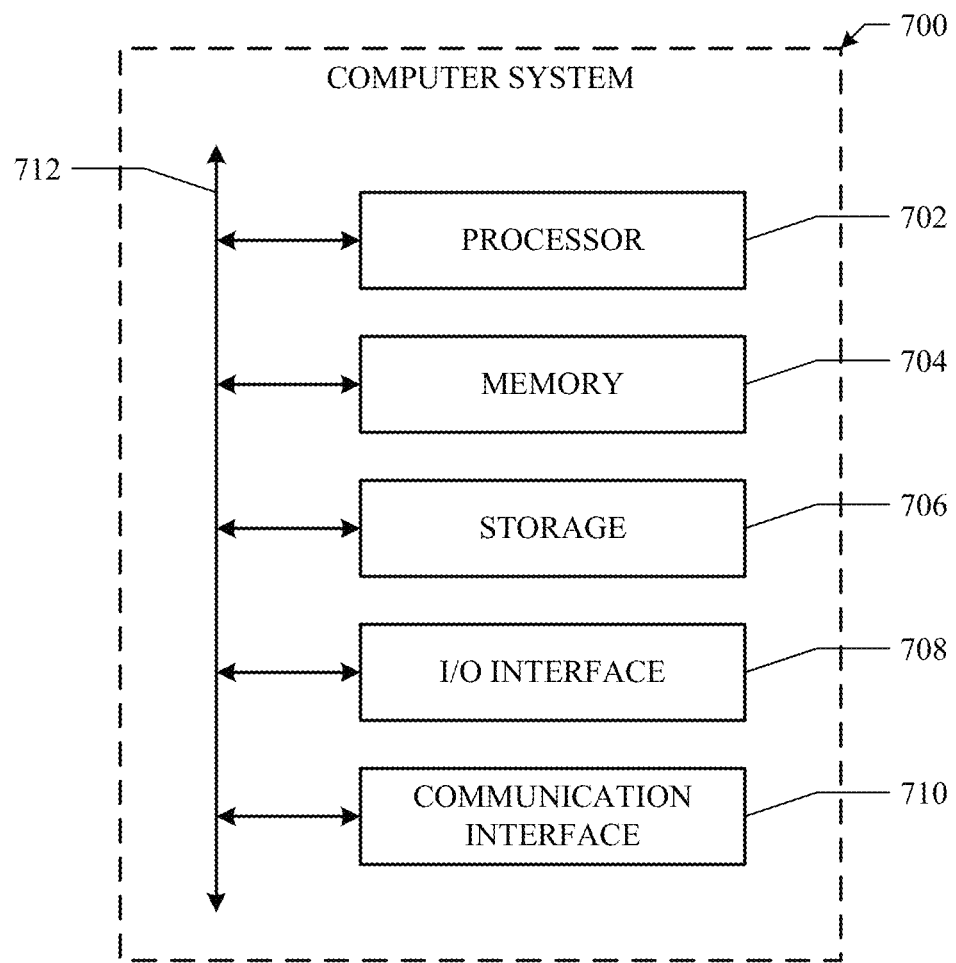
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
  generating audio segments from a speech signal;
  generating latent representations that respectively correspond to the audio segments, the latent representations comprising a first subset and a second subset;
  generating quantized representations that respectively correspond to the latent representations;
  masking the second subset of the latent representations;
  using a machine-learning model to process the first subset of the latent representations and the masked second subset of the latent representations to generate contextualized representations that respectively correspond to the latent representations;
  pre-training the machine-learning model based on comparisons between (1) a subset of the contextualized representations that respectively correspond to the masked second subset of the latent representations and (2) a subset of the quantized representations that respectively correspond to the masked second subset of the latent representations; and
  training the pre-trained machine-learning model to perform a speech analysis task.

2. The method of claim 1, further comprising:
  normalizing the speech signal to zero mean and unit variance.

3. The method of claim 1, wherein generating the audio segments is based on one or more time-steps, and wherein each of the one or more time-steps comprises an amount of time.

4. The method of claim 1, wherein generating the latent representations is based on a multi-layer convolutional neural network.

5. The method of claim 1, wherein generating the quantized representations is based on product quantization.

6. The method of claim 1, wherein generating each of the quantized representations comprises:
  accessing a plurality of codebooks, wherein each of the plurality of codebooks comprises a plurality of vector entries;
  selecting one vector entry from each of the plurality of codebooks;
  concatenating the plurality of vector entries to generate a concatenated vector; and
  applying a linear transformation to the concatenated vector to generate the quantized representation.

7. The method of claim 6, wherein generating each of the quantized representations is based on a diversity loss function, and wherein the diversity loss function optimizes a probability of selecting each of the plurality of vector entries in each of the plurality of codebooks to be equal.

8. The method of claim 1, wherein each of the quantized representations is associated with a true quantized representation and one or more distractors, wherein generating the contextualized representations is based on a contrastive loss function, and wherein the contrastive loss function optimizes a contextualized representation to be similar to a corresponding true quantized representation but different from the one or more associated distractors.

9. The method of claim 1, wherein pre-training the machine-learning model is on a plurality of unlabeled training data.

10. The method of claim 1, wherein training the pre-trained machine-learning model is based on one or more labeled training data, wherein the one or more labeled training data are associated with the speech analysis task.

11. The method of claim 1, wherein the speech signal is based on a plurality of languages.

12. The method of claim 11, wherein each of the latent representations is common to the plurality of languages.

13. The method of claim 11, wherein each of the quantized representations is common to the plurality of languages.

14. The method of claim 11, wherein each of the contextualized representations is common to the plurality of languages.

15. The method of claim 11, wherein pretraining the machine-learning model is based on a plurality of unlabeled training data associated with the plurality of languages.

16. One or more computer-readable non-transitory storage media embodying software that is operable when executed to:
- generate audio segments from a speech signal;
- generate latent representations that respectively correspond to the audio segments, the latent representations comprising a first subset and a second subset;
- generate quantized representations that respectively correspond to the latent representations;
- mask the second subset of the latent representations;
- use a machine-learning model to process the first subset of the latent representations and the masked second subset of the latent representations to generate contextualized representations that respectively correspond to the latent representations;
- pre-train the machine-learning model based on comparisons between (1) a subset of the contextualized representations that respectively correspond to the masked second subset of the latent representations and (2) a subset of the quantized representations that respectively correspond to the masked second subset of the latent representations; and
- train the pre-trained machine-learning model to perform a speech analysis task.

17. The media of claim 16, wherein generating each of the quantized representations comprises:
- accessing a plurality of codebooks, wherein each of the plurality of codebooks comprises a plurality of vector entries;
- selecting one vector entry from each of the plurality of codebooks;
- concatenating the plurality of vector entries to generate a concatenated vector; and
- applying a linear transformation to the concatenated vector to generate the quantized representation.

18. A system comprising: one or more processors; and a non-transitory memory coupled to the processors comprising instructions executable by the processors, the processors operable when executing the instructions to:
- generate audio segments from a speech signal;
- generate latent representations that respectively correspond to the audio segments, the latent representations comprising a first subset and a second subset;
- generate quantized representations that respectively correspond to the latent representations;
- mask the second subset of the latent representations;
- use a machine-learning model to process the first subset of the latent representations and the masked second subset of the latent representations to generate contextualized representations that respectively correspond to the latent representations;
- pre-train the machine-learning model based on comparisons between (1) a subset of the contextualized representations that respectively correspond to the masked second subset of the latent representations and (2) a subset of the quantized representations that respectively correspond to the masked second subset of the latent representations; and
- train the pre-trained machine-learning model to perform a speech analysis task.

19. The system of claim 18, wherein generating each of the quantized representations comprises:
- accessing a plurality of codebooks, wherein each of the plurality of codebooks comprises a plurality of vector entries;
- selecting one vector entry from each of the plurality of codebooks;
- concatenating the plurality of vector entries to generate a concatenated vector; and
- applying a linear transformation to the concatenated vector to generate the quantized representation.

* * * * *